US012678769B2

(12) United States Patent
Abdelnaby et al.

(10) Patent No.: US 12,678,769 B2
(45) Date of Patent: Jul. 14, 2026

(54) AZO-LINKED ORGANIC POLYMERS FOR CARBON DIOXIDE CAPTURE AND METAL ION REMOVAL

(71) Applicant: KING FAHD UNIVERSITY OF PETROLEUM AND MINERALS, Dhahran (SA)

(72) Inventors: Mahmoud Mohamed Abdelnaby, Dhahran (SA); Tawfik Abdo Saleh, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 535 days.

(21) Appl. No.: 18/182,024

(22) Filed: Mar. 10, 2023

(65) Prior Publication Data

US 2024/0299908 A1 Sep. 12, 2024

(51) Int. Cl.

*B01J 20/26* (2006.01)
*B01D 53/02* (2006.01)
(Continued)

(52) U.S. Cl.

CPC ............ *B01J 20/262* (2013.01); *B01D 53/02* (2013.01); *B01J 20/28059* (2013.01); (Continued)

(58) Field of Classification Search

USPC .......................................................... 528/219
See application file for complete search history.

(56) References Cited

U.S. PATENT DOCUMENTS 10,150,094 B2 * 12/2018 Saleh ..................... B01J 20/205
10,889,678 B2 * 1/2021 Al Hamouz ........... C08G 12/34

FOREIGN PATENT DOCUMENTS

CN 107175084 A 9/2017
CN 107930606 A 4/2018
(Continued)

OTHER PUBLICATIONS

Abdelnaby, et al., "Azo-Linked Porous Organic Polymers for Selective Carbon Dioxide Capture and Metal Ion Removal," ACS Omega 2022, 7, 14535-14543. (Year: 2022).*
(Continued)

*Primary Examiner* — Fred M Teskin
(74) *Attorney, Agent, or Firm* — Oblon, McClelland, Maier & Neustadt, L.L.P.

(57) ABSTRACT

A polymer including reacted units of 1,3,5-trihydroxybenzene and a compound A represented by Formula (I) below, (I)

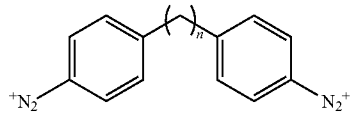

in Formula (I), n=0-5. Compound A is bonded to the 1,3,5-trihydroxybenzene through an azo bond to form the polymer, represented by Formula (II) below, (II)

(Continued)

-continued

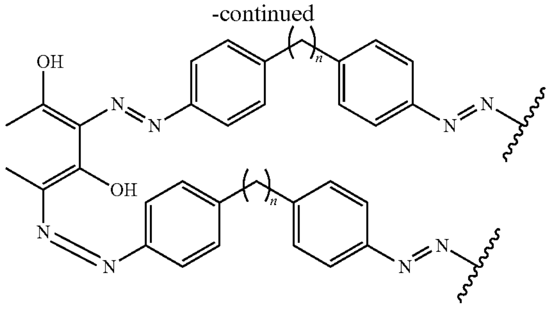

in Formula (II), 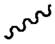 represents a repeating unit of the polymer.

19 Claims, 23 Drawing Sheets

(51) Int. Cl.

| | |
|---|---|
| ***B01J 20/28*** | (2006.01) |
| ***B01J 20/30*** | (2006.01) |
| ***C02F 1/28*** | (2023.01) |
| ***C08G 73/00*** | (2006.01) |
| *C02F 101/10* | (2006.01) |
| *C02F 101/22* | (2006.01) |

(52) U.S. Cl.

CPC ... *B01J 20/28061* (2013.01); *B01J 20/28071* (2013.01); *B01J 20/2808* (2013.01); *B01J 20/28083* (2013.01); *B01J 20/28085* (2013.01); *B01J 20/28092* (2013.01); *B01J 20/3085* (2013.01); *C02F 1/285* (2013.01); *C08G 73/00* (2013.01); *B01D 2253/202* (2013.01); *B01D 2253/304* (2013.01); *B01D 2253/306* (2013.01); *B01D 2253/311* (2013.01); *C02F 2101/103* (2013.01); *C02F 2101/22* (2013.01)

(56) References Cited

FOREIGN PATENT DOCUMENTS

| | | |
|---|---|---|
| CN | 112023980 A | 12/2020 |
| WO | 2013/169705 A1 | 11/2013 |

OTHER PUBLICATIONS

Katsoulidis, et al. ; Phloroglucinol Based Microporous Polymeric Organic Frameworks with -OHFunctional Groups and High CO2 Capture Capacity ; Chemistry of Materials 23(7) ; Mar. 2011 ; 15 Pages ; Abstract Only.

Ma, et al. ; Cage Based Crystalline Covalent Organic Frameworks ; J. Am. Chem. Soc. 141, 9 ; Feb. 18, 2019 ; 9 Pages ; Abstract Only.

* cited by examiner

AZO-LINKED ORGANIC POLYMERS FOR CARBON DIOXIDE CAPTURE AND METAL ION REMOVAL

STATEMENT OF PRIOR DISCLOSURE BY INVENTOR

Aspects of the present disclosure are described in M. M. Abdelnaby, T. A. Saleh, M. Zeama, M. A. Abdalla, H. M. Ahmed, and M. A. Habib "Azo-Linked Porous Organic Polymers for Selective Carbon Dioxide Capture and Metal Ion Removal"; ACS Omega; Apr. 21, 2022; 7, 14535-14543, incorporated herein by reference in its entirety.

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to organic polymers, particularly azo-linked organic polymers, for carbon dioxide capture and metal ion removal.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention. Porous materials such as zeolites, metal-organic frameworks (MOFs), porous polymers, and porous carbons have increasingly shown promise in different energy and environmental applications, including but not limited to catalysis, gas separation, $CO_2$ capture, and wastewater treatment. Porous organic polymers (POPs) have emerged as versatile solid adsorbents for selective $CO_2$ capture and metal ion removal due to their exceptional physical, chemical and mechanical properties, high surface areas, and structural diversity with the ability to introduce various functional groups.

POPs are commonly constructed by robust covalent bonds, which make their porous structure a prominent sorbent candidate for efficient $CO_2$ capture. The chemical stability of the POPs also allows them to have an excellent ability to survive in harsh environmental conditions of water at different pHs and can be used for removing toxic metal ions such as mercury (Hg), arsenic (As), chromium (Cr), copper (Cu), and nickel (Ni) from wastewater. These toxic metal ions are a serious problem for the environment and human consumption.

A wide range of functional POPs have been developed such as covalent organic frameworks (COFs), covalent triazine frameworks (CTFs), porous aromatic frameworks (PAFs), conjugated microporous polymers (CMPs), polymers with intrinsic microporosity (PIMs), and hyper-cross-linked polymers (HCPs). Despite the varieties of developed POPs, their large-scale industrial implementation is still challenging due to the low yield and costly starting materials for the synthesis (e.g., COFs and CMPs), the expensive catalysts used (e.g., CMPs and PAFs), and the high synthesis temperature (e.g., PAFs and CTFs).

Azo-linked POPs have recently attracted significant interest due to their facile, green synthesis at low temperatures in water and high yield. The facile synthesis and versatility to introduce polar functional groups and Lewis basic sites (known to have good binding to $CO_2$ gas) pave the way for the azo-linked POPs to be efficient solid sorbents for $CO_2$ capture and in metal ion removal from wastewater. The azo-linked POPs with nitrogen double bonds work as selective binding sites for the $CO_2$ and metal ions without compromising the chemical stability.

Although a few azo-linked polymers have been developed in the past, most must be made using methods that require the use of harmful organic solvents, expensive catalysts, or high temperatures. Therefore, there still exists a need to develop azo-linked POPs that serve dual applications of $CO_2$ capture and heavy metal ion removal in a simple and cost-effective manner.

SUMMARY

In an exemplary embodiment, a polymer is described. The polymer includes reacted units of 1,3,5-trihydroxy benzene; and a compound A represented by Formula (I) below, (I)

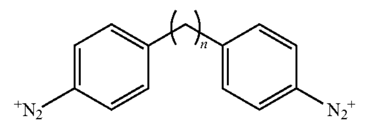

wherein in Formula (I), n=0-5, 'A' is bonded to the 1,3,5-trihydroxybenzene through an azo bond to form the polymer, represented by Formula (II) below, (II)

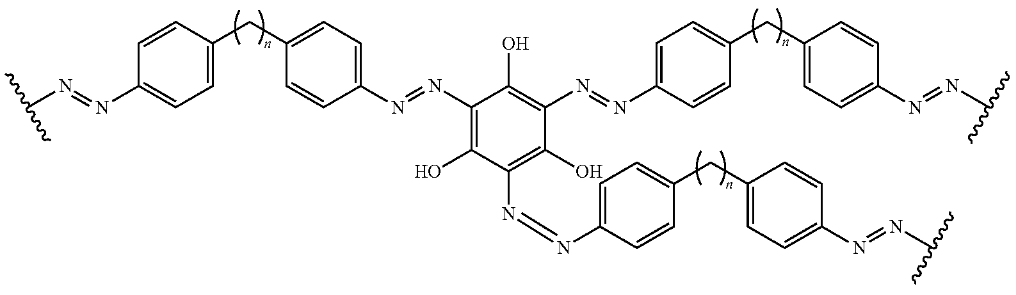

wherein in Formula (II),  represents a repeating unit of the polymer.

In some embodiments, wherein n=0, and wherein the polymer has a BET surface area of 270-320 square meters per gram ($m^2/g$).

In some embodiments, the polymer has a pore volume of 0.28-0.35 centimeters cubed per gram ($cm^3/g$).

In some embodiments, the polymer has only micropores with a diameter of less than 2 nanometers (nm).

In some embodiments, when n=1, and wherein the polymer has a BET surface area of 70-90 $m^2/g$.

In some embodiments, the polymer has a pore volume of 0.05-0.20 $cm^3/g$.

In some embodiments, the polymer has micropores and mesopores; the micropores have a diameter of less than 2 nm, and the mesopores have a diameter of 10-100 nm.

In some embodiments, the polymer has a thermal stability up to 250° C.

In some embodiments, the polymer has a $CO_2$ uptake of 25-35 $cm^3/g$ at 273 K and 1 bar.

In some embodiments, the polymer has a $CO_2$ uptake of 15-25 $cm^3/g$ at 273 K and 1 bar.

In an exemplary embodiment, a method of adsorbing carbon dioxide is described. The method includes contacting the polymer with the carbon dioxide.

In some embodiments, the polymer selectively adsorbs the carbon dioxide, and does not adsorb other gases selected from the group consisting of nitrogen, oxygen, and argon.

In an exemplary embodiment, a method of adsorbing a metal ion from a solution is described. The method includes contacting the polymer with the solution, wherein the polymer adsorbs the metal ion.

In some embodiments, the solution has a pH of 3-7.

In some embodiments, the method includes contacting the polymer with the solution for 1 to 120 minutes.

In some embodiments, a metal of the metal ion is selected from the group consisting of antimony, arsenic, bismuth, cadmium, cerium, chromium, cobalt, copper, gallium, gold, iron, lead, manganese, mercury, nickel, platinum, silver, tellurium, thallium, tin, uranium, vanadium, and zinc.

In some embodiments, the polymer is present in an amount of 5-50 milligrams per milli liter (mg/mL) of the solution.

In some embodiments, the polymer adsorbed at least 85% of the metal ion.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
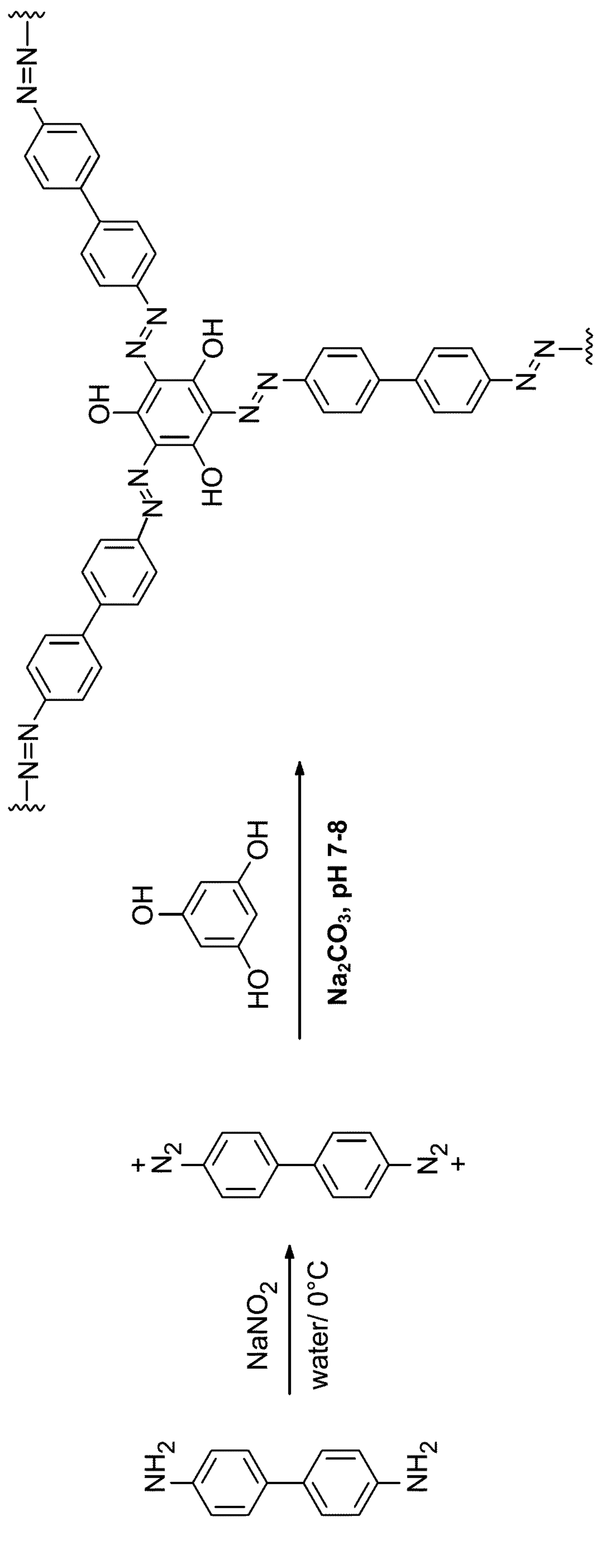
FIG. 1A is a schematic illustration depicting synthesis of an azo-linked polymer P1, according to certain embodiments.
Figure 1B:
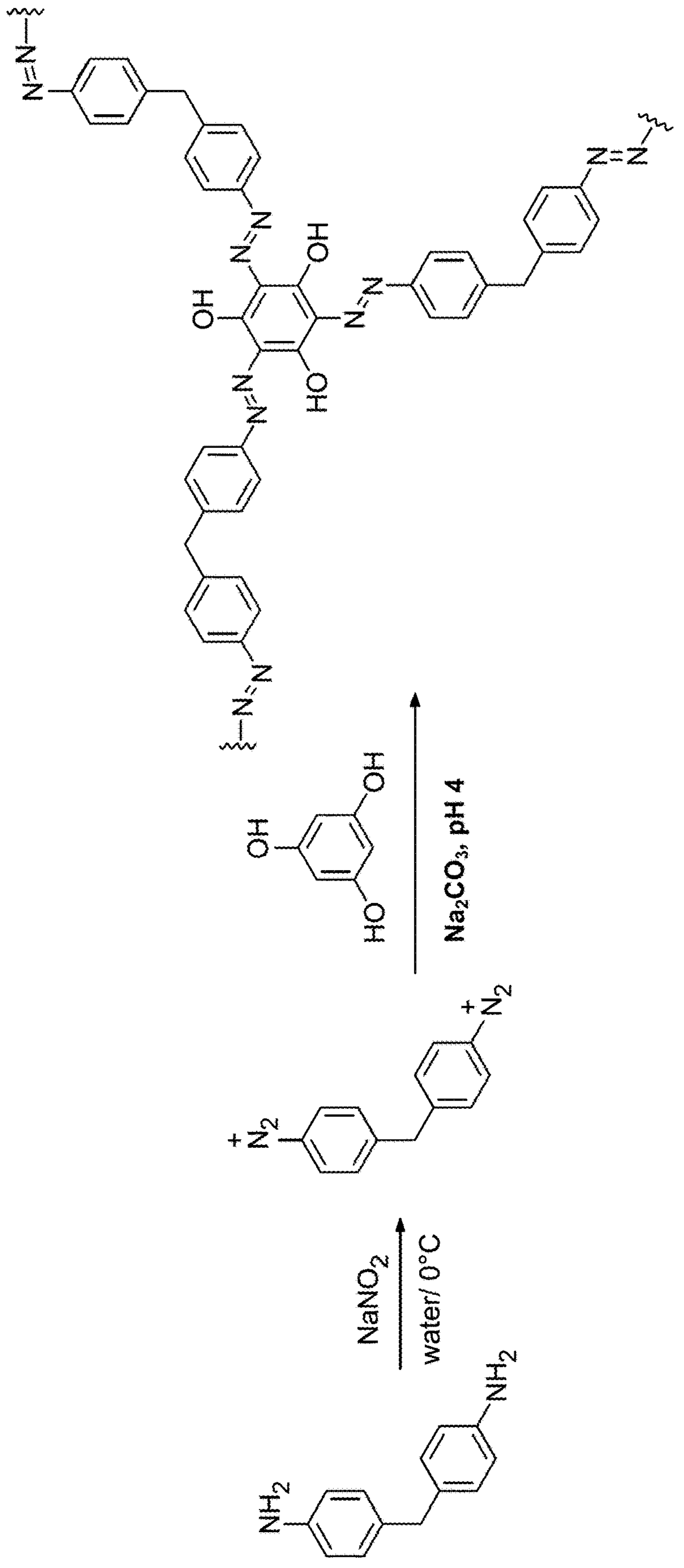
FIG. 1B is a schematic illustration depicting synthesis of an azo-linked polymer P2, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —SO2NH2), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art.

Aspects of the present disclosure are directed to a porous organic polymer (POP), also referred to as the polymer, made by a facile and environmentally friendly method for use in carbon dioxide capture, and metal ion removal.

In some embodiments, the polymer includes a phenyl group directly substituted with at least one hydroxy group, preferably 1, 2, 3 or 4 hydroxy groups. In some embodiments, the polymer includes reacted units of 1,3,5-trihydroxybenzene, and a compound A represented by Formula (I) below.

(I)

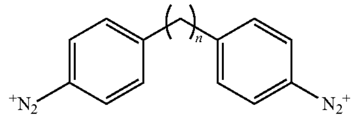

In Formula (I), 'n'=0, 1, 2, 3, 4 or 5. In a preferred embodiment, n=0 or 1. In some embodiments, the phenyl rings of the compound A are optionally substituted as depicted in Formula (Ia) below.

(Ia)

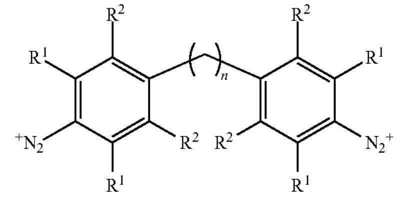

In some embodiments, $R^1$ and $R^2$ are selected from the group consisting of a straight or branch alkyl chain with 1-10 carbons, a hydroxyl group, a halogen, a carboxylic acid group, and an aromatic group with 6-15 carbons. In some embodiments, $R^1$ and $R^2$ are the same or different. In preferred embodiments, $R^1$ and $R^2$ are hydrogen.

The compound A is bonded to the 1,3,5-trihydroxybenzene through an azo bond to form the polymer. An azo bond is defined as an R—N═N—R' bond. The polymer is represented by Formula (II) below.

(II)

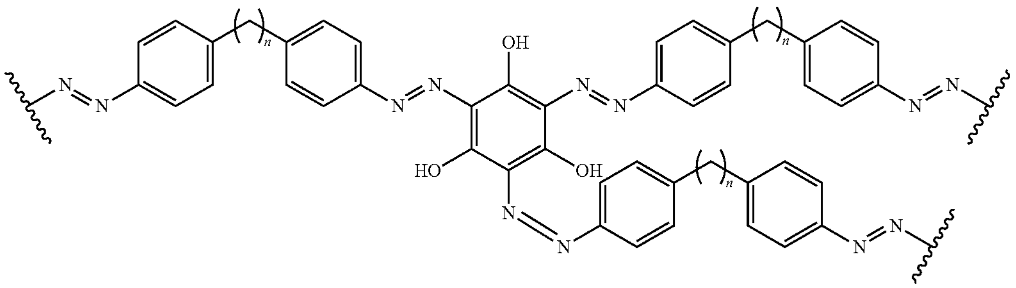

In Formula (II)  represents a repeating unit of the polymer. In some embodiments, there are 2-1,000 repeating units of the polymer, preferably 10-900, 20-800, 30-700, 40-600, 50-500, 60-400, 70-300, 80-200, or 90-100 repeating units. One of ordinary skill in the art would recognize that Formula (II) could be modified based on substitutions of $R^1$ and $R^2$ in Formula (Ia).

In some embodiments, the polymer has a thermal stability up to 250° C., preferably 250-350° C., or approximately 300° C. In some embodiments, the polymer includes 65-75 wt. % carbon, preferably 67-73 wt. %, or 69-71 wt. %, 15-25 wt. % oxygen, preferably 17-23 wt. %, or 19-21 wt. %, and 5-15 wt. % nitrogen, preferably 7-13 wt. %, or 9-11 wt. %.

Figure 13:
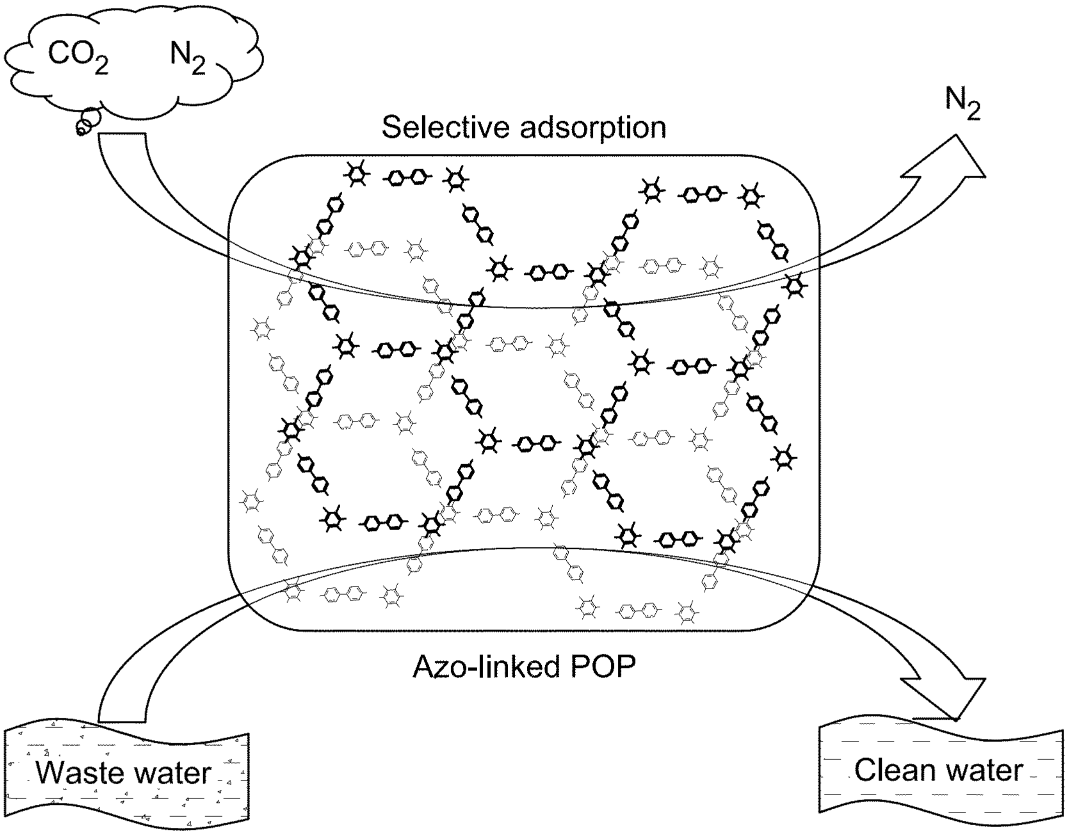
FIG. 13 is a schematic illustration depicting application of porous organic polymers of the present disclosure in $CO_2$ capture and water treatment, according to certain embodiments.

In some embodiments, the repeating units of the polymer form a honeycomb porous structure. A depiction of an embodiment of the honeycomb structure is shown in FIG. 13. In some embodiments, the polymer forms a hexagonal honeycomb sheet structure. In some embodiments, the hexagonal honeycomb sheet structure has multiple sheets stacked on top of one another to form a columnar structure with voids or pores in the center of each hexagon wherein the hexagons are formed of the polymer. In some embodiments, the sheets are directly stacked on top of one another, and the pores are unobstructed. In some embodiments, the sheets are offset in a vertical and/or horizontal direction, and thereby one sheet obstructs a pore of another sheet, as depicted in FIG. 13. In some embodiments, the sheets are offset by 0.1-10 nm, preferably 1-9 nm, 3-8 nm, 4-7 nm, or 5-6 nm.

In some embodiments, the polymer structure has one or both of micropores and mesopores. Micropores are defined herein as pores with a diameter of less than 2 nm and mesopores are defined herein as pores with a diameter of 10-100 nm. In some embodiments, when n=0, the polymer has only micropores with a diameter of less than 2 nm, preferably 0.1-1 nm, or approximately 0.5 nm. In some embodiments, when n=1, the polymer has both micropores with a diameter of less than 2 nm, preferably 0.1-1 nm, or approximately 0.5 nm, and mesopores with a diameter of 10-100 nm, preferably 20-90 nm, 30-80 nm, 40-70 nm, or 50-60 nm.

While not wishing to be bound to one theory, it is thought that an increase in pore size is due to disorder and flexibility in the system. Therefore, as n increases and more flexibility is introduced to the polymer, the amount of mesopores and the amount of disorder in the polymer structure increases. Whereas when n=0 the polymer forms a more ordered structure with only the micropores formed from the stacking of the sheets approximately on top of one another. Whereas, when n=1, some sheets stack on top of one another to form the micropores, while some are disordered and form the mesopores.

In some embodiments, the polymer has a BET surface area in a range of 70-300 $m^2/g$, particularly 100-250 $m^2/g$, and more particularly 150-200 $m^2/g$. In some embodiments, when n=0, the polymer has a BET surface area of 270-320 $m^2/g$, particularly 280-300 $m^2/g$, and more particularly about 290 $m^2/g$. In some embodiments, when n=1, the polymer has a BET surface area of 70-90 $m^2/g$, particularly 75-80 $m^2/g$, and more particularly about 78 $m^2/g$. While not wishing to be bound to one theory, it is thought that an increase in surface area is due to the increased order in the system allowing for more repeating units of the polymer.

In some embodiments, the polymer has a pore volume of 0.1-0.4 $cm^3/g$, preferably 0.15-0.35 $cm^3/g$. In some embodiments, when n=0, the pore volume is in a range of 0.28-0.35 $cm^3/g$, particularly 0.3-0.35 $cm^3/g$, and more particularly 0.33 $cm^3/g$. In some embodiments, when n=1, the pore volume of 0.05-0.20 $cm^3/g$, particularly, 0.1-0.2 $cm^3/g$, and more particularly about 0.15 $cm^3/g$.

In some embodiments, the polymer of the present disclosure is synthesized by the following process. One of ordinary skill in the art would recognize that this method could be modified based on the substitutions of the starting materials.

The first step involves diazotization (to form $N_2^+$) of benzidine as in the structure of Formula (1a). Benzidine may be procured commercially or synthesized by any methods conventionally known in the art. In a preferred embodiment, the benzidine monomer may be synthesized by nitration of biphenyl to yield 4,4'-dinitrobiphenyl. The nitration may be conducted with a nitrating mixture (a mixture of concentrated nitric acid and sulfuric acid). In some embodiments, the nitration may be conducted with zeolites with $N_2O_5$ or $NO_2/O_3$. In some embodiments, the nitration is conducted using $N_2O_5$ to yield 4,4'-dinitrobiphenyl. This is further reduced with a catalyst such as Pd/C in ethanol or H-beta to obtain benzidine. The reaction conditions and the concentrations of the individual reactants or the catalyst may be adjusted to obtain benzidine with high purity and selectivity. Such modifications may be obvious to a person skilled in the art.

The diazotization is conducted by preparation of diazonium salt of benzidine by treatment of benzidine with nitrous acid or sodium nitrite, preferably sodium nitrate. Then, hydrochloric acid is added to complete the diazotization reaction in aqueous solutions. It is preferred that the hydrochloric acid is used in excess to prevent partial diazotization and condensation of the diazonium salt with the un-diazotized benzidine to form the diazonium salt of benzidine. The diazotization reaction is conducted at a temperature range of −2 to 5° C. for a period of 10 to 60 minutes, under constant stirring to obtain the diazonium salt of benzidine. The diazonium salt is further neutralized to a pH 7-8 using a base. The base may be an organic or inorganic. In a preferred embodiment, the base is an inorganic base. Suitable examples of bases include NaOH, $Ca(OH)_2$, KOH, LiOH, CsOH, or carbonates such as sodium carbonate.

In the second step, an azo-coupling of the diazonium salt with a phenyl directly substituted with at least one hydroxy group compound to yield the polymer. In an embodiment, the phenyl directly substituted with at least one hydroxy group compound is 1,3,5-trihydroxybenzene. The azo-coupling reaction was conducted for a period of 6-15 hours, preferably 8-12 hours, more preferably for about 12 hours, at a temperature range of 0-10° C. to obtain a crude polymer. The crude polymer may be purified by washing it with a solvent. The solvent may be an organic solvent, inorganic solvent, or a combination thereof. In some embodiments, the solvent is water. In some embodiments, the solvent is an alcohol such as ethanol, isopropanol, etc. In some embodiments, the solvent is dimethyl formamide (DMF). The crude polymer is further filtered and dried (to remove the solvents) to obtain the azo-linked polymer P1. The drying may be conducted in an oven for a temperature range of 60-80° C., preferably 70-80° C., and more preferably to about 75° C. for a period of 10-20 hours, preferably 112-15 hours, more preferably about 12 hours, at a pressure less than 100 mTorr, to obtain the polymer.

According to certain aspects of the present disclosure, a method of adsorbing $CO_2$ is described. The method includes contacting the polymer with carbon dioxide. In some embodiments, the $CO_2$ is a gas stream. In some embodiments, the $CO_2$ is in the atmosphere or dissolved in water. In some embodiments, the method includes contacting the polymer with the $CO_2$ at a temperature of 30-100° C., preferably 40-90° C., 50-80° C., or 60-70° C. In some embodiments, the method includes contacting the polymer with the gas stream at a pressure of 1-15 bar, preferably 3-13 bar, 5-11 bar, or 7-9 bar of the $CO_2$. In some embodiments, the gas stream is at least 20 percent by volume (v. %) $CO_2$, preferably at least 30 v. %, 40 v. %, 50 v. %, 60 v. %, 70 v. %, 80 v. %, 90 v. %, or 100 v. % $CO_2$ based on the total volume of the gas stream.

In some embodiments, other possible gasses in the gas stream may include but is not limited to, nitrogen, hydrogen, oxygen, water (vapor), carbon monoxide, hydrocarbons having 1-4 carbon atoms (e.g., methane, ethane, ethylene, acetylene, propane, propylene, butane, iso-butane), nitrogen oxides (i.e., nitric oxide, nitrous oxide, nitrogen dioxide), and noble gases (e.g., helium, neon, argon, krypton, xenon), including mixtures thereof. In some embodiments, the $CO_2$ may be sourced from large fossil fuel or biomass electricity power plants, industries with major $CO_2$ emissions, natural gas processing, synthetic fuel plants, and fossil fuel-based hydrogen production plants.

In some embodiments, the polymer selectively adsorbs carbon dioxide and does not adsorb other gases, such as nitrogen, oxygen, and argon. While not wishing to be bound to a single theory, it is thought that the reason for the selective adsorption of the polymer towards $CO_2$ is the presence of $CO_2$-philic polar functional groups (—N═N— and OH) in the polymer framework.

In some embodiments, the polymer has a $CO_2$ uptake of 10-50 $cm^3/g$ at 273 K and 1 bar, preferably 20-40 $cm^3/g$ or approximately 30 $cm^3/g$. In some embodiments, when n=0, the polymer has a $CO_2$ uptake of 25-35 $cm^3/g$ at 273 K and 1 bar, preferably 27-33 $cm^3/g$ or approximately 30 $cm^3/g$. In some embodiments, when n=1, the polymer has a $CO_2$ uptake of 15-25 $cm^3/g$ at 273 K and 1 bar, preferably 17-22 $cm^3/g$ or approximately 20 $cm^3/g$.

In some embodiments, a method of adsorbing an ion from a solution is described. The method includes contacting the polymer with the solution, wherein the polymer adsorbs the ion. In some embodiments, the contacting refers to mixing the polymer into the solution. The mixing can be by any method known in the art including but not limited to sonicating, mechanical or manual stirring. In some embodiments, the polymer is at least partially submerged in the solution. In a preferred embodiment, the solution is an aqueous solution, preferably wastewater. The polymer interacts with the ion via surface complexation, π-metal interactions, interactions with functional groups, and/or electrostatic interactions to remove ions.

In a preferred embodiment, the ions are cations. In a more preferred embodiment, the ions are ions of metals. A metal of the metal ion is selected from the group consisting of antimony, arsenic, bismuth, cadmium, cerium, chromium, cobalt, copper, gallium, gold, iron, lead, manganese, mercury, nickel, platinum, silver, tellurium, thallium, tin, uranium, vanadium, and zinc.

In some embodiments, the solution has a pH of 3-7, preferably 4-6, or approximately 5. In some embodiments, the polymer is present in an amount of 5-50 mg per mL of the solution, preferably 10-40 mg/mL, or 20-30 mg/mL. In some embodiments, the polymer is contacted with the solution including the metal ion for 1 to 120 minutes, preferably 20-100 minutes, or 50-60 minutes. In some embodiments, the solution has a temperature of 10-90° C., preferably 20-80° C., 30-70° C., or 40-60° C. In some embodiments, the polymer adsorbs at least 85% of the metal ions, preferably 90%, 95%, or 100%.

EXAMPLES

The following examples demonstrate the azo-linked polymers, as described herein. The examples are provided solely for illustration and are not to be construed as limitations of the present disclosure, as many variations thereof are possible without departing from the spirit and scope of the present disclosure.

Example 1: Materials and Methods

All chemicals and reagents were used as received without further purification. Biphenyl (99% purity), 1,3,5-trihydroxybenzene (phloroglucinol, 98%), 4,4'-methylenedianiline (97% purity), sodium nitrite (98% purity), and sodium carbonate (98% purity) were purchased from Alfa Aesar. Nitric acid (70%), sulfuric acid (98%), hydrochloric acid (HCl, 37%), and toluene (high purity) were obtained from Acros. Methanol (99.9% purity), N,N'-dimethylformamide (DMF, 99% purity), and Pd/C (5% w/w) were purchased from Millipore Sigma. Ultrapure water was obtained using a Milli-Q Ultrapure instrument. For the metal removal analysis, standard solutions (1000 ppm) containing lead (Pb(II)), mercury (Hg(II)), arsenic (As(III)), copper (Cu(II)), chromium (Cr(III)), and nickel (Ni(II)) were purchased from Sigma-Aldrich and used to prepare the required solutions for testing with a pre-determined initial concentration. For gas sorption analysis, nitrogen gas (99.999% purity), carbon dioxide gas (99.99% purity), and helium (99.999% purity) were supplied from Air Liquide, Dammam, Saudi Arabia.

Example 2: Gas Sorption Measurements

Porosity and low-pressure gas uptake measurements were conducted using a Quantachrome Quadrasorp Evo volumetric analyzer (manufactured by Quantachrome Instruments, 1900 Corporate Dr, Boynton Beach, Florida, 33426, United States). The samples were activated before the measurement by heating at 110° C. under reduced pressure (<50 mTorr). For the $N_2$ isotherms for the BET surface area calculation, liquid nitrogen was used, while for the gas uptake at 0 and 25° C., a water chiller circulator was used for cooling.

Example 3: Metal Ion Removal Studies

Adsorption experiments were performed to evaluate the prepared materials for removing metal ions from aqueous media. The effect of the related experimental conditions, such as adsorbent dosage, solution pH, and contact time, was investigated at atmospheric temperature. Metal ion detection was performed in triplicate, and the average was considered to calculate the percent removal as:

$$\text{Adsorption (\%)} = \frac{c_i - c_f}{c_i} \times 100,$$

where the initial and final metal ions concentrations are $C_i$ and $C_f$, respectively. The capacities of adsorption were evaluated by the equation:

$$q_t = (C_i - C_t) \times \frac{V}{m}.$$

where $C_t$ refers to the metal concentration at any time t, V represents the volume of metal solution (L), m denotes the mass of the adsorbent (mg), and $q_t$ refers to the adsorption capacity of the prepared polymer.

The developed polymers were subjected to a five-cycle adsorption/desorption test to estimate their re-use performance. After adsorption, the metals were desorbed from the polymers using 10 mL of 0.5 mol $L^{-1}$ HCl. Thus, the adsorbent (polymer) was treated with HCl solution with stirring for 10 min to ensure all metals were desorbed from the polymer. The polymer was then separated from the solution and allowed to dry. It was then used for the adsorption in the next cycle.

Example 4: Characterization Instruments

The high-resolution solid-state cross-polarization magic angle spinning $^{13}C$ nuclear magnetic resonance (CP-MAS $^{13}C$ NMR) spectra were obtained on a JEOL ECA-600 spectrometer (14.1 T) equipped with an additional 1 kW power amplifier (manufactured by JEOL Ltd., 3-1-2 Musashino, Akishima, Tokyo 196-8558). The pulse was set at 3.8 μs, and 10000 scans were accumulated with spinning at 15 KHz and a 5 s delay. A 4 mm $ZrO_2$ rotor was used. The chemical shifts were referenced to the carbon species of adamantane at 38.52 and 29.47 ppm. Fourier transform infrared (FT-IR) spectra were obtained on a PerkinElmer 16 PC spectrometer (manufactured by PerkinElmer, 940 Winter St, Waltham, Massachusetts, 02451, United States) using KBr pellets. The spectra were recorded from 4000 to 500 $cm^{-1}$. The FT-IR signals were identified as follows: br, broad; s, strong; m, medium; w, weak. The SEM images and the elemental composition (C and N) contents of the polymers were determined from an EDX analysis using a Quattro S field-emission scanning electron microscope (FE-SEM). The thermal stability of the synthesized azo polymers was identified by a thermogravimetric analysis (TGA) using a TA Q500 instrument (manufactured by TA Instruments Corporate Headquarters 159 Lukens Drive New Castle, DE 19720) under an air flow with a heating rate of 10° C./min. Powder X-ray diffraction (PXRD) was carried out using a Rigaku MiniFlex II instrument with Cu Kα radiation (λ=1.541 Å (manufactured by Rigaku, 3-9-12 Matsubara-cho, Akishima-shi, Tokyo, 196-8666, Japan). For the metal removal studies, a PlasmaQuant PQ 9000 ICP-OES instrument (manufactured by Analytik Jena GmbH, Konrad-Zuse-Str. 1, 07745 Jena/Germany) was used to determine the metal contents.

Example 5: Material Synthesis

The synthesis of the 4,4'-diaminobiphenyl (benzidine) monomer was started by the nitration of biphenyl, and then the resulting 4,4'-dinitrobiphenyl was reduced using Pd/C in ethanol to produce high-purity 4,4'-diaminobiphenyl. Next, azo-linked polymer P1 and azo-linked polymer P2 were synthesized following the reported procedures with some modifications. Finally, the coupling reaction to form the azo POPs was carried out through two in situ steps: the formation of the diazonium salts and then coupling with hydroxybenzene.

Example 6: Synthesis of the Azo-Linked Polymer P1

4,4'-Diaminobiphenyl (9 mmol, 1.6 g) was suspended in 20 mL of DI water and concentrated HCl (4.2 mL) in a 100 mL round flask, and the mixture was stirred in an ice bath (0-5° C.) or 15 min; after that, a pre-cooled sodium nitrite solution (27 mmol, 1.95 g in 10 mL) was added dropwise. At this point, a clear solution of the diazonium salt was formed. The solution was stirred at 0° C. for 30 min and then neutralized to pH 7-8 using drops of a saturated $Na_2CO_3$ aqueous solution. In another 50 mL round flask, a pre-cooled solution of phloroglucinol (6 mmol, 0.67 g in 30 mL) was neutralized to pH 7-8 using drops of saturated $NaCO_3$ aqueous solution, which was subsequently added dropwise to the diazonium salt solution. The instantaneous precipitation of a dark brown polymer occurred with the addition. The reaction was then stirred for 12 h. The product was separated by filtration under reduced pressure and repeatedly washed with water and once with methanol and then washed with 30 mL of DMF with stirring for 2 h. After that, the product was filtered and subjected to Soxhlet extraction with methanol for 24 h. Finally, the product was dried in a vacuum oven (pressure less than 100 mTorr) at 75 for 12 h (1.45 g, 80% yield). In the context of this disclosure, in azo-linked polymer P1, n=0. Anal. Calcd for $C_{48}H_{32}N_{12}O_6$: C, 66.04; H, 3.69; N, 19.25. Found experimentally from the EDX analysis: C, 70.3; N, 12.7. FT-IR (KBr, $cm^{-1}$): 3404 (br), 1610 (m), 1402 (m), 1308 (w), 105 (w).

Example 7: Synthesis of Azo-Linked Polymer P2

Azo-linked polymer P2 was synthesized by following the same procedure as for azo-linked polymer P1 except using 4,4'-methylenedianiline (9 mmol, 1.78 g) and adjusting the pH to only 4 instead of 8 to produce a brown polymeric product (2.4 g, yield 98%). In the context of this disclosure, in azo-linked polymer P2, n=1. Anal. Calcd for $C_{48}H_{32}N_{12}O_6$: C, 66.95; H, 4.18; N, 18.37. Found experimentally from the EDX analysis: C, 21.7; N, 8.9. FT-IR (KBr, $cm^{-1}$): 3404 (br), 2756 (w), 1610 (m), 1402 (m), 1308 (w), 105 (w).

Example 8: Henry's Gas Selectivity

The $CO_2/N_2$ selectivity of the prepared azo-polymers was calculated based on Henry's model. Henry's equation is:

$$q=kP,$$

where q is the gas uptake ($cm^3\ g^{-1}$), p is the gas pressure (torr), and k is Henry's constant ($cm^3\ g^{-1}\ torr^{-1}$).

Example 9: Calculation of $CO_2/N_2$ & $CO_2/CH_4$ IAST Selectivity

The IAST is an approach used in predicting the selectivity of sorbents towards multi-component gas mixtures from the pure component isotherms of each gas. IAST model assumes an analogy between the adsorption and Raoult's vapor-liquid equilibrium law to represent a relationship between the bulk gas phase and adsorbed phase as:

$$y_iP_t=x_iP_i,$$

where $P_t$ is the total pressure of the gas mixture in the bulk phase, $P_i$ is the standard state pressure of pure component i, which yields the same spreading pressure as that of the mixture at the same temperature, $y_i$ is the bulk phase molar fraction of component i, and $x_i$ is adsorbed phase molar fraction of component i. For a binary gas mixture system, e.g., $CO_2/N_2$, the equilibrium obtained from the spreading pressure results in:

$$\int_0^{PCO_2} \frac{qCO_2}{P} dP = \int_0^{PN_2} \frac{qN_2}{P} dP.$$

Combining the above two equations results in the following:

$$\int_0^{\frac{yCO_2 P_t}{xCO_2}} \frac{qCO_2}{P} dP = \int_0^{\frac{yN_2 P_t}{xN_2}} \frac{qN_2}{P} dP.$$

Here, $qCO_2$ and $qN_2$ are the equations representing the pure component isotherm of each gas, obtained by fitting adsorption isotherms experimental data to the dual-site Langmuir adsorption model as:

$$q_i = \frac{q_{max1,i} K1_i y_i P_t}{1 + K1_i y_i P_t} + \frac{q_{max2,i} K2_i y_i P_t}{1 + K2_i y_i P_t},$$

where $q_{max1}$,i and $q_{max2}$,i are the saturation capacity of component i for site 1 and 2, respectively, $K1_i$ and $K2_i$ are the affinity constants of component i for site 1 and site 2, respectively. i corresponds to either $CO_2$ or $N_2$.

The molar fractions of all components within a mixture must add up to unity.

$$yCO_2 + yN_2 = 1$$

$$xCO_2 + xN_2 = 1$$

Given $P_t$, y, $q_{max}$, and K, only one unknown variable quantity x can be solved by MATLAB software. The selectivity can, then, be estimated as:

$$S = \frac{xCO_2 / yCO_2}{xN_2 / yN_2}$$

Example 10: Structure Characterization

Figure 2A:
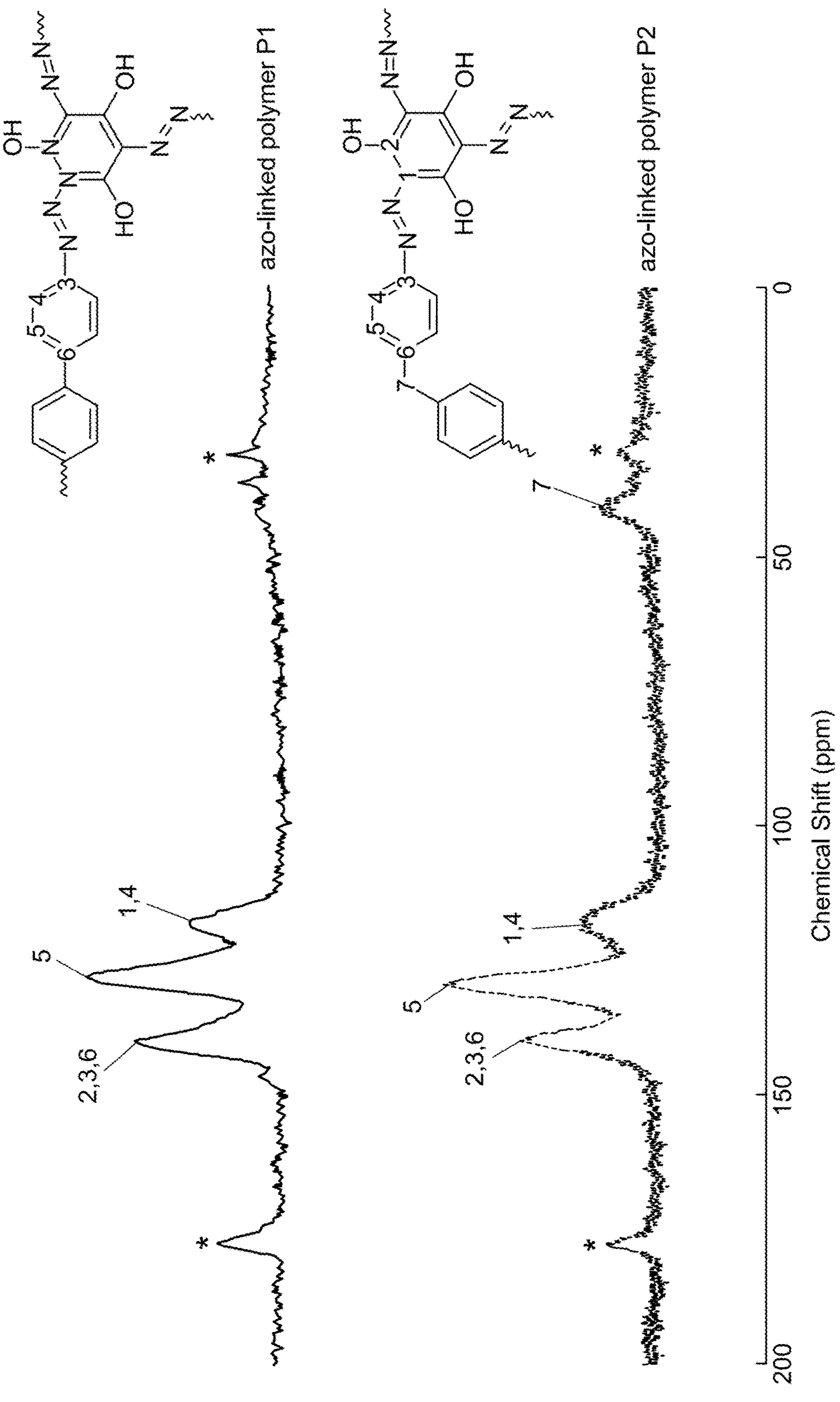
FIG. 2A depicts a solid-state Cross-Polarization Magic Angle Spinning Carbon-13 Nuclear Magnetic Resonance (CP/MAS $^{13}C$-NMR) spectra of the azo-linked polymer P1 and the azo-linked polymer P2, according to certain embodiments.
Figure 2B:
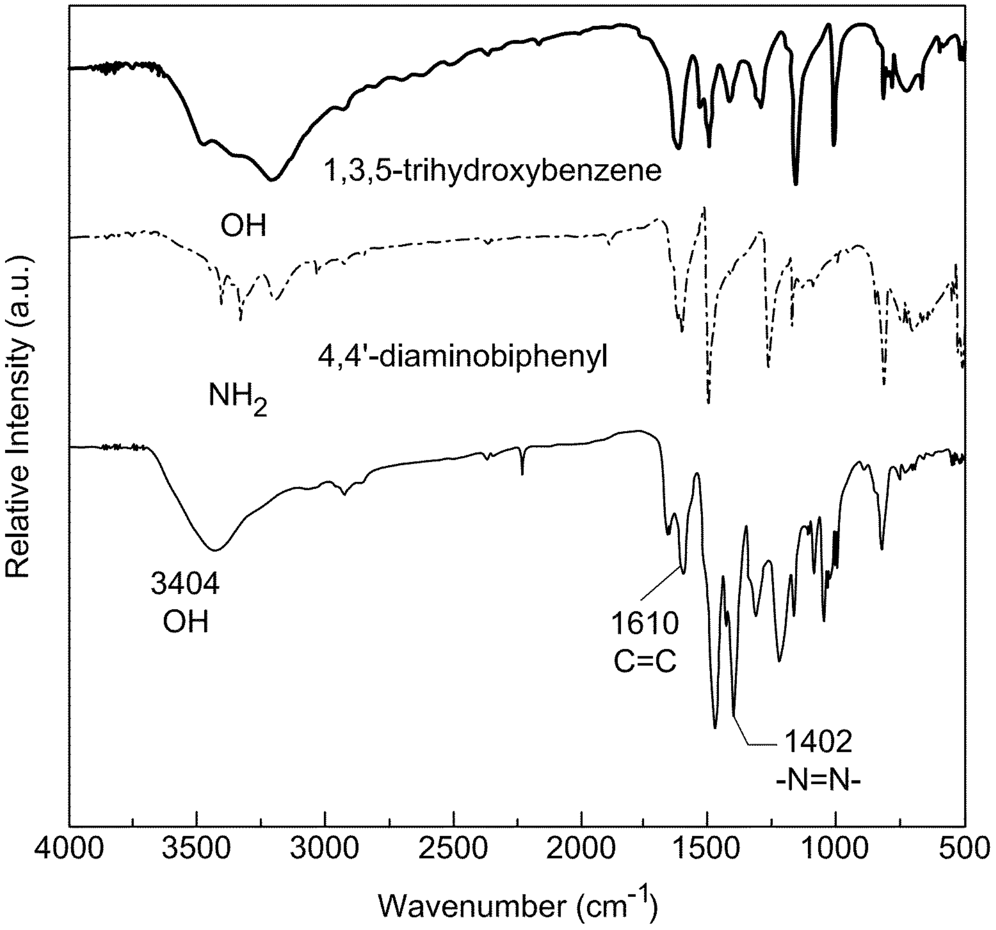
FIG. 2B depicts a Fourier Transform Infrared (FTIR) spectra of the azo-linked polymer P1 and their corresponding monomers, according to certain embodiments.

The successful formation of the azo-linked polymers was confirmed by the solid-state CP-MAS $^{13}C$ NMR (FIG. 2A) and the FT-IR spectra (FIG. 2B). The characteristic CP-MAS $^{13}C$ NMR signals for the two monomer units constructing both azo-linked polymer P1 and azo-linked polymer P2 were assigned as follows (FIG. 2A): (i) the peak at δ 117 ppm corresponds to aromatic carbons of the 1,3,5-trihydroxybenzene attached to the azo group (carbon 1, $C_{ph}$—N═N—). In comparison, the peak at δ 140 ppm is assigned to the aromatic carbon attached to the OH group (carbon 2, C—OH). Peaks at δ 117, 128, and 140 ppm are characteristic of 4,4'-diaminobiphenyl and 4,4'-methylenedianiline aromatic carbons. δ 40 ppm is the characteristic peak for the methylene (—$CH_2$—) linkage of the 4,4'-methylenedianiline monomer of the azo-linked polymer P1, which is not present in the $^{13}C$ NMR spectrum of the azo-linked polymer P1. Together, these assigned signals provide direct evidence for the successful construction of the azo polymers from their corresponding monomers.

Figure 2C:
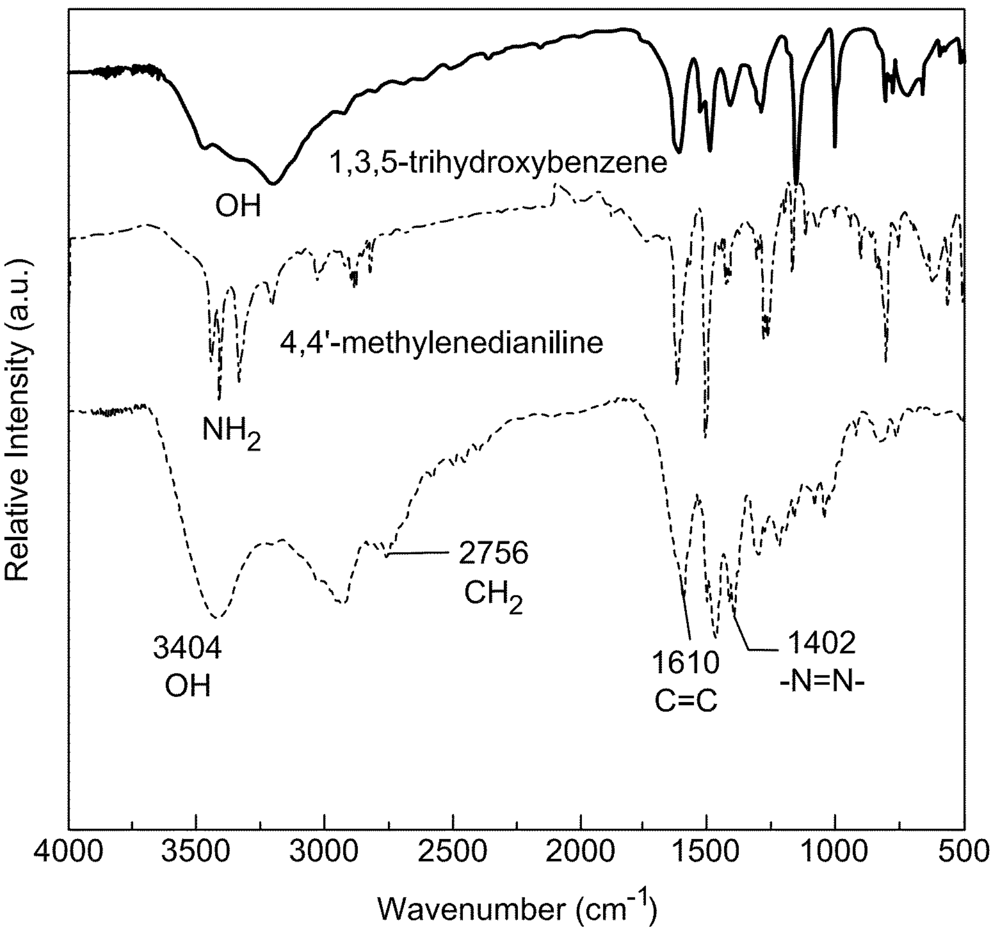
FIG. 2C depicts an FTIR spectra of the azo-linked polymer P2 and their corresponding monomers, according to certain embodiments.

The FT-IR spectra provide additional structure elucidation for the azo-linkage formation between the diamine and the 1,3,5-trihydroxybenzene (FIG. 2B and FIG. 2C). The vibrational band around 1400 $cm^{-1}$ confirms the presence of the azo (—N═N—) group. On the other hand, the disappearance of the $NH_2$ bands of the monomers (two sharp bands around 3400 $cm^{-1}$) in the resulting polymers is also direct evidence of the azo coupling formation of the diamine monomers. In comparison, the broad band centered at 3404 $cm^{-1}$ in the polymers is attributed to the 1,3,5-trihydroxy monomer in the structure.

Figure 3:
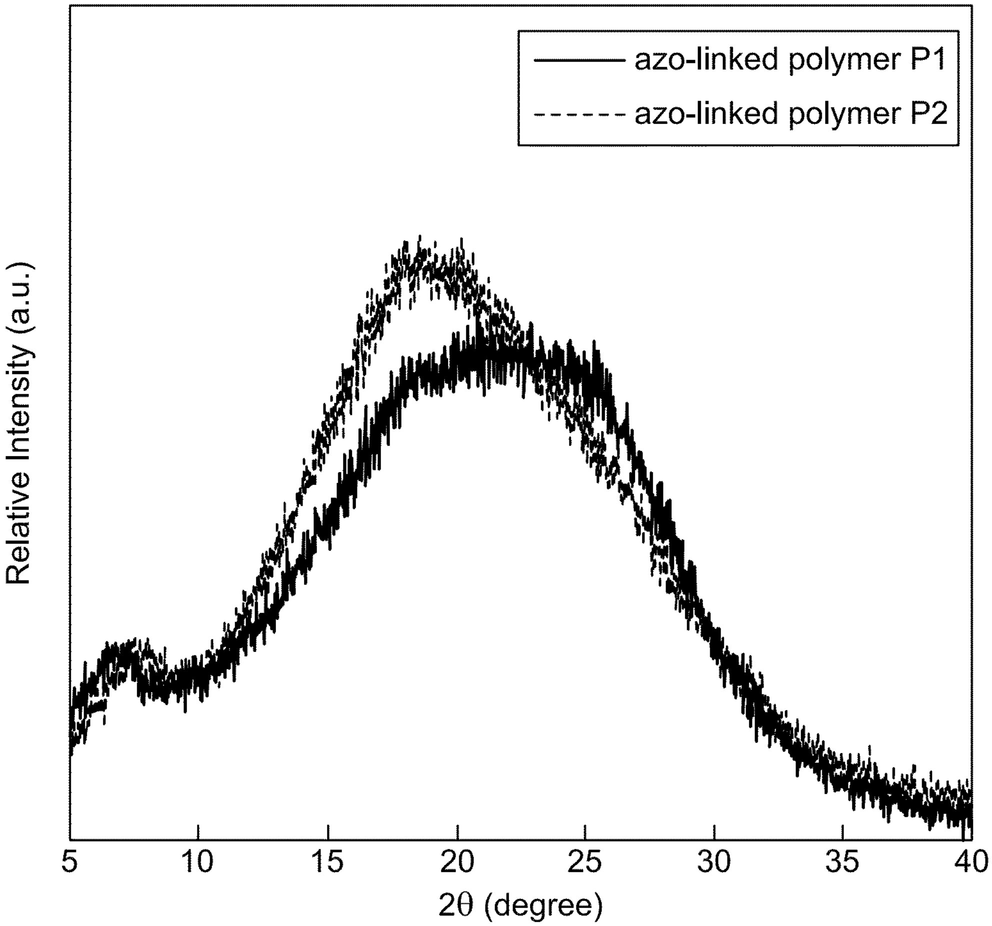
FIG. 3 depicts powder X-ray diffraction (PXRD) of the azo-linked polymer P1 and the azo-linked polymer P2, according to certain embodiments.
Figure 4A:
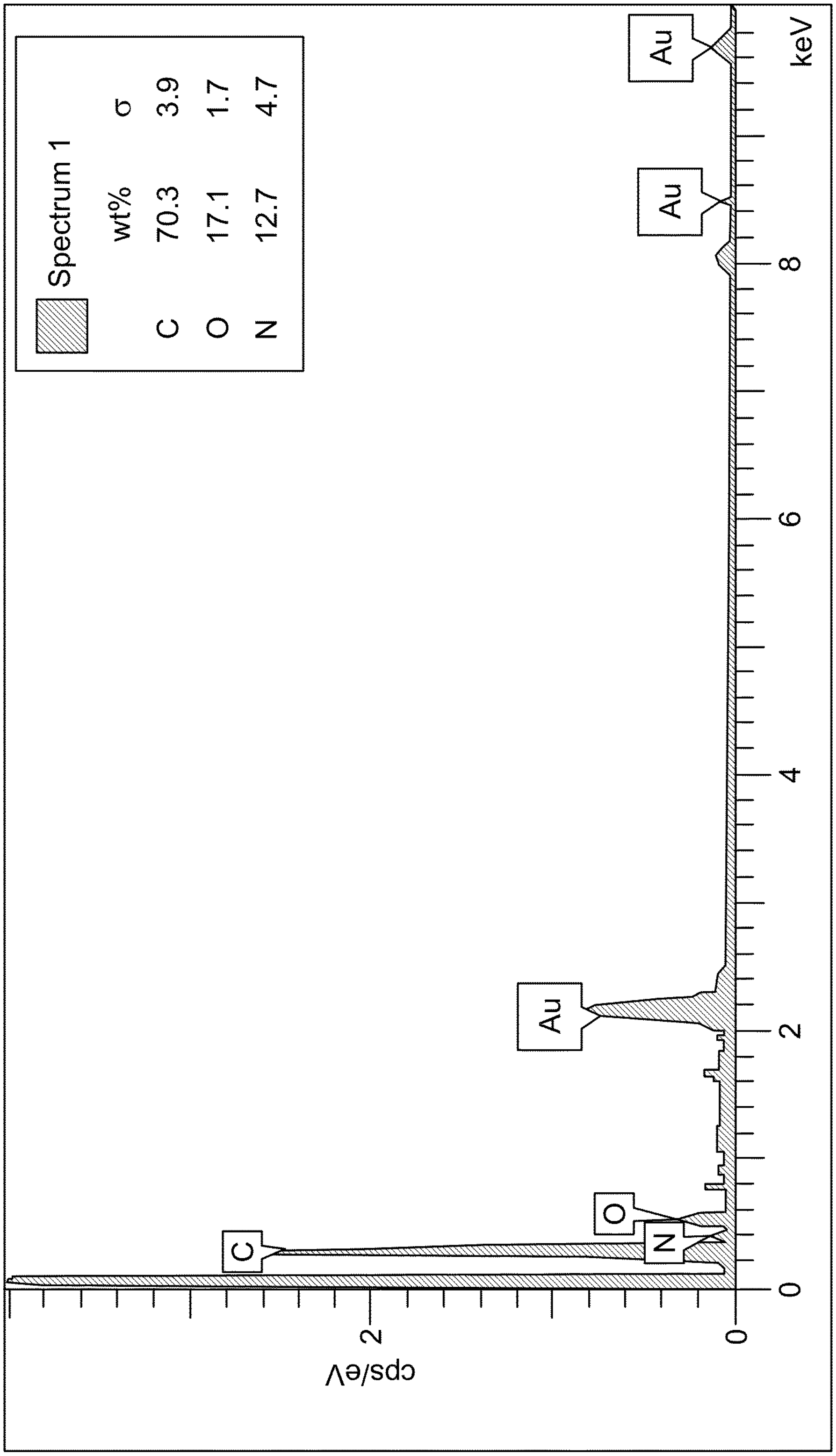
FIG. 4A depicts energy dispersive X-ray spectroscopic analysis (EDX) of the azo-linked polymer P1, according to certain embodiments.
Figure 4B:
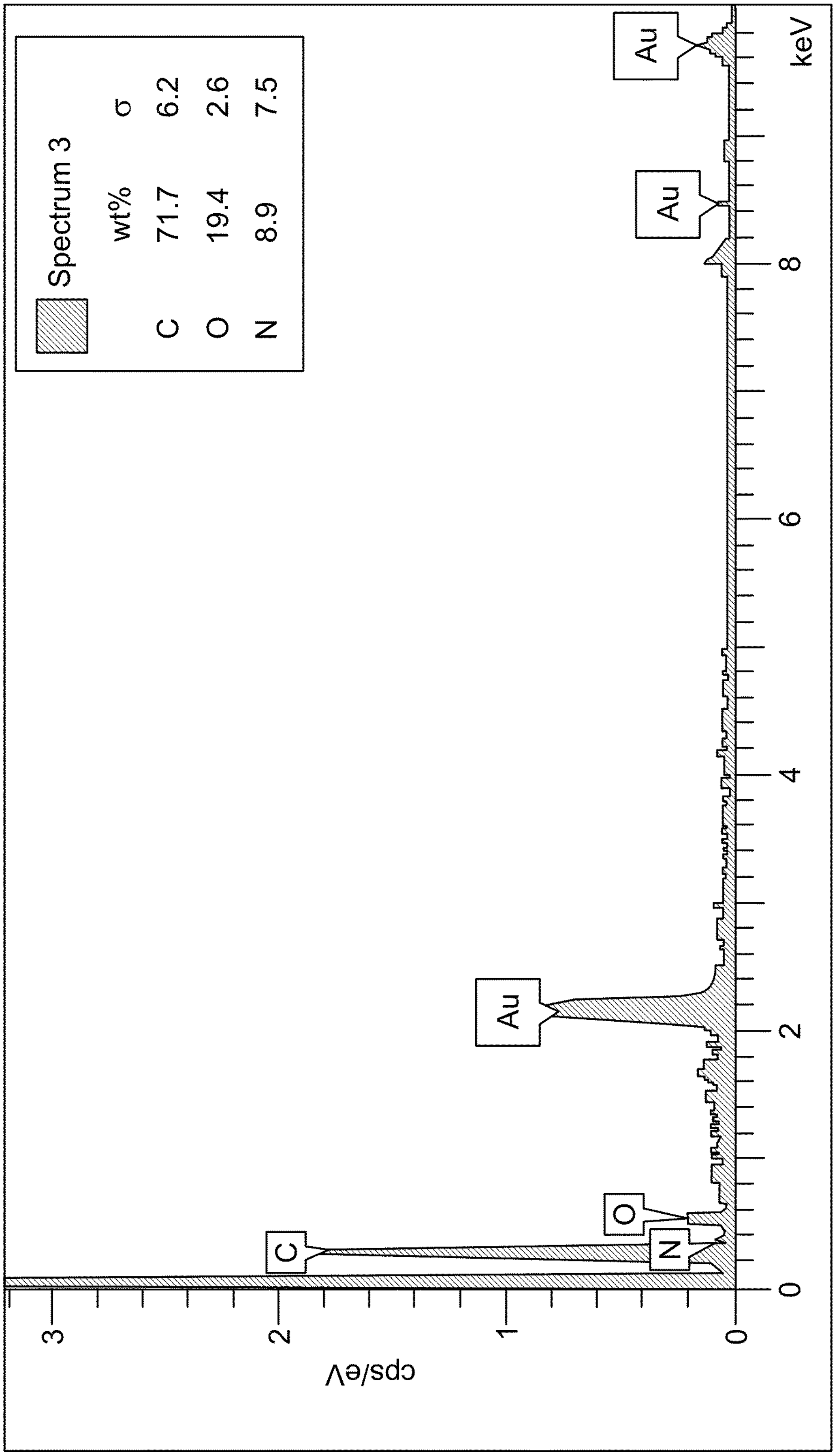
FIG. 4B depicts EDX analysis of the azo-linked polymer P2, according to certain embodiments.
Figure 5A:
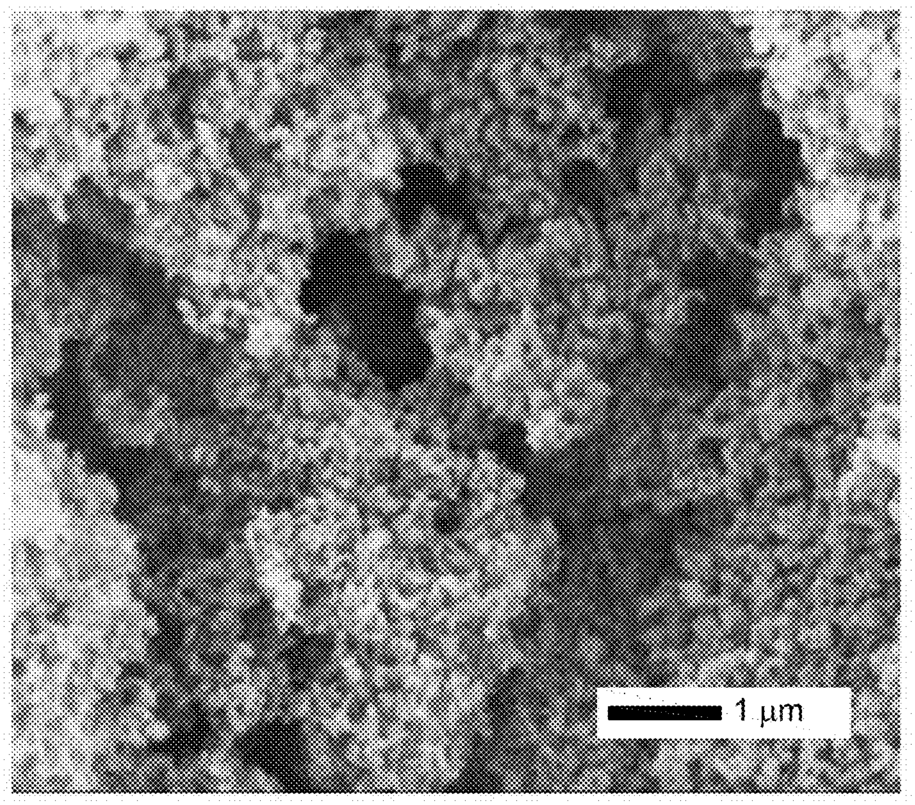
FIG. 5A depicts a scanning electron microscopic (SEM) image of the azo-linked polymer P1, according to certain embodiments.
Figure 5B:
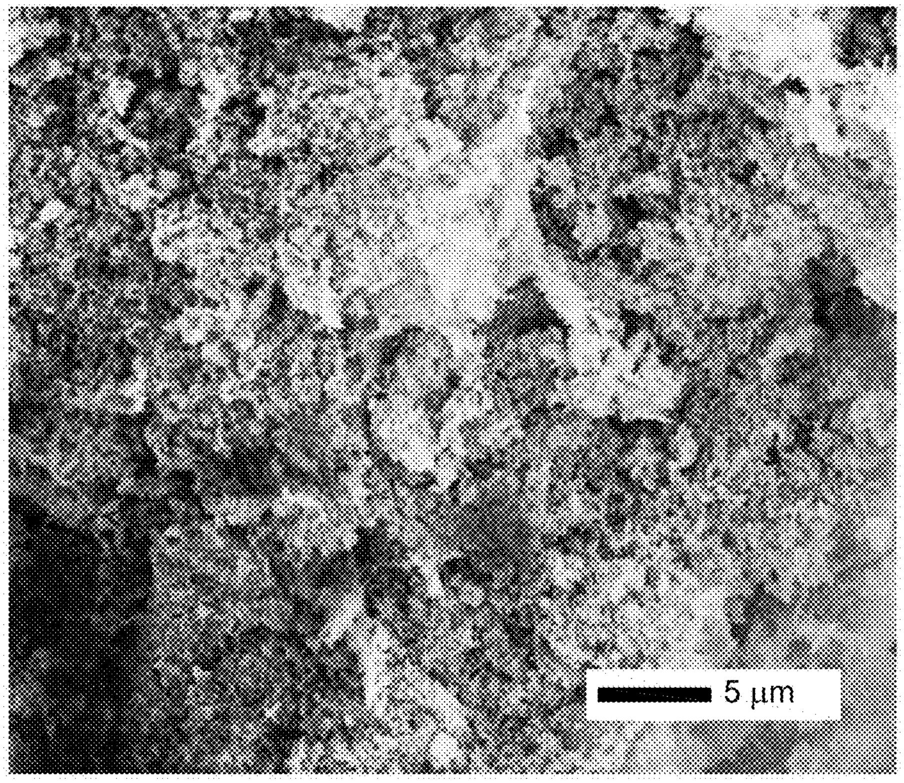
FIG. 5B depicts a SEM image of the azo-linked polymer P2, according to certain embodiments.

The powder X-ray diffraction analysis of the azo-linked polymer P1 and the azo-linked polymer P2 has demonstrated the amorphous nature of both materials with a broad peak centered at around 20°, as shown in FIG. 3. FIG. 4A depicts the EDX of the azo-linked polymer P1, while the EDX analysis of the azo-linked polymer P2 is depicted in FIG. 4B. The SEM images of the azo-linked polymer P1 and the azo-linked polymer P2 show the amorphous microstructures of the samples with irregular shapes, as shown in FIG. 5A and FIG. 5B, respectively.

Figure 6A:
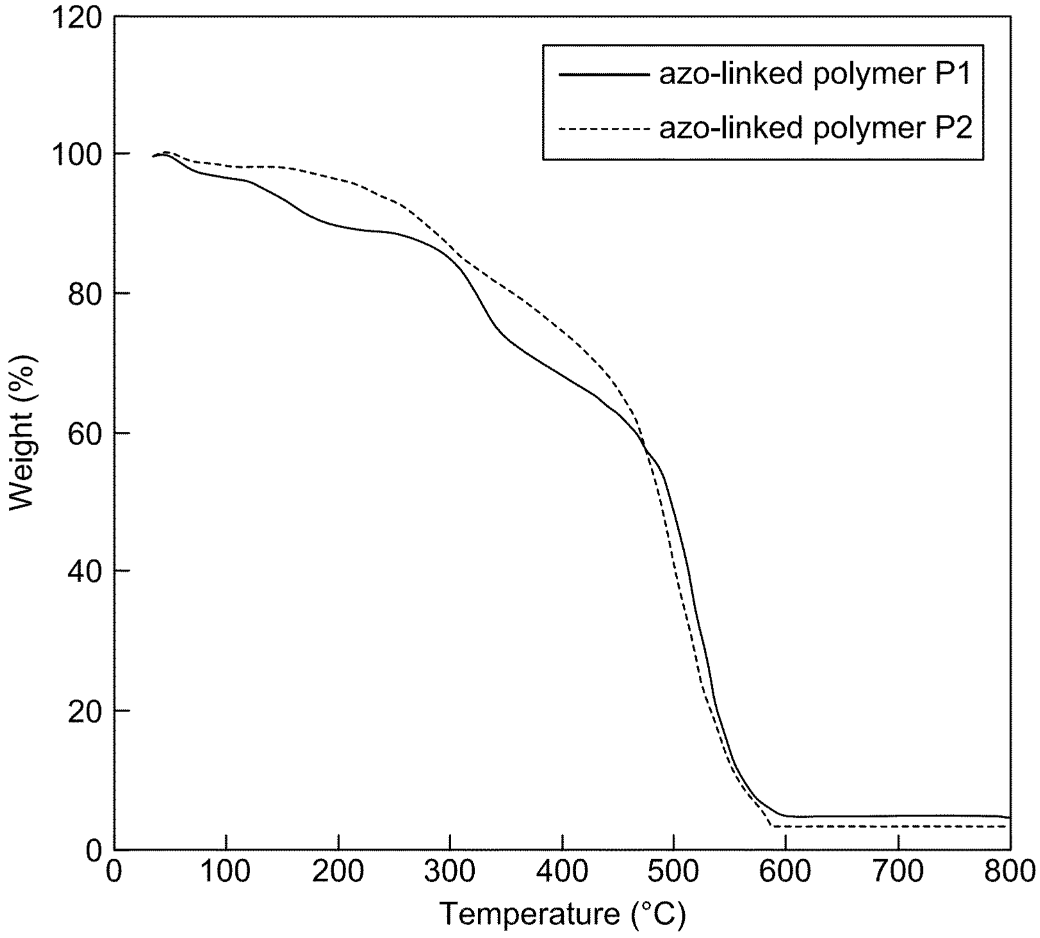
FIG. 6A is a plot depicting thermogravimetric analysis (TGA) of the azo-linked polymer P1, and the azo-linked polymer P2, according to certain embodiments.
Figure 6B:
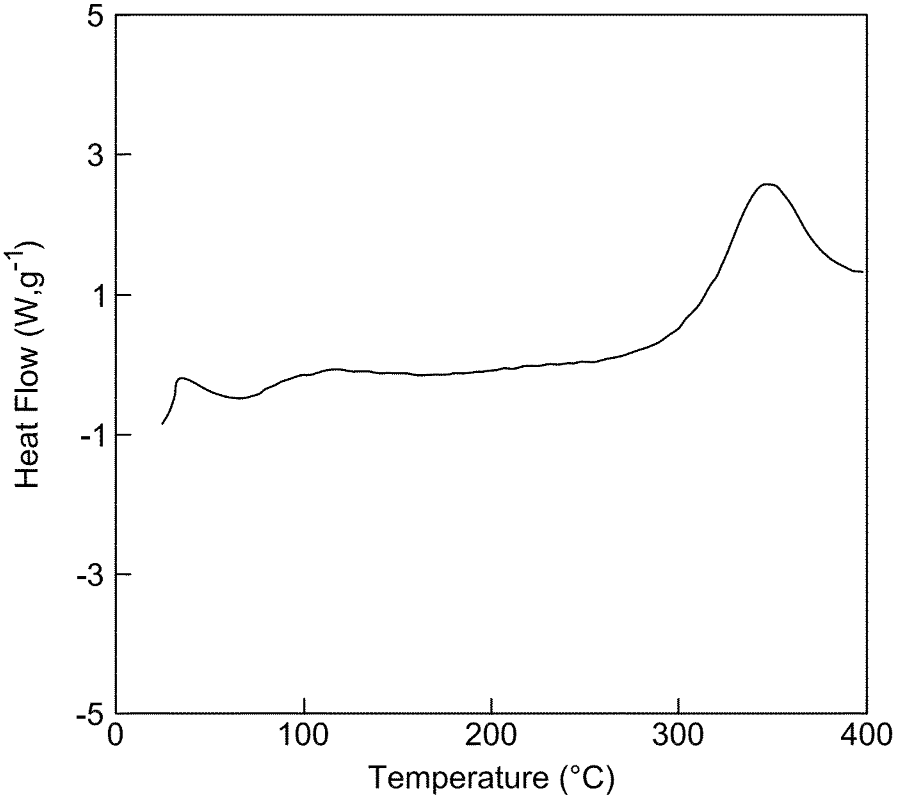
FIG. 6B is a plot depicting differential scanning colorimetric (DSC) analysis of the azo-linked polymer P1, according to certain embodiments.
Figure 6C:
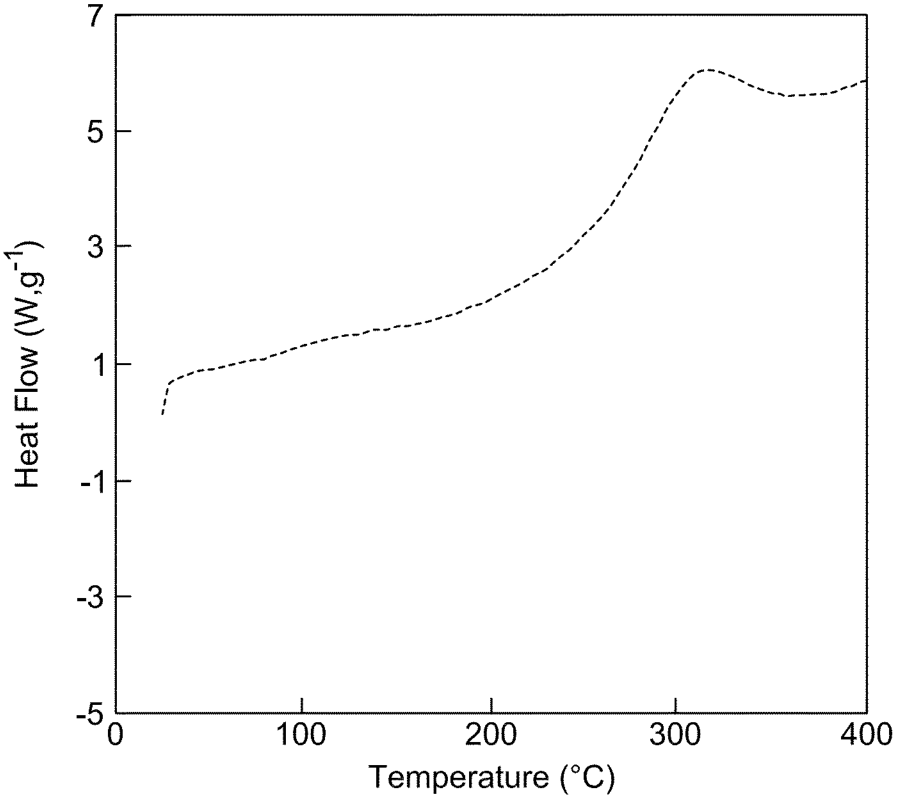
FIG. 6C is a plot depicting the DSC analysis of the azo-linked polymer P2, according to certain embodiments.

A TGA study of the azo-linked polymer P1 and the azo-linked polymer P2 is depicted in FIG. 6A. The DSC analysis of the azo-linked polymer P1 and the azo-linked polymer P2 is depicted in FIG. 6B and FIG. 6C, respectively. From a combined reading of FIGS. 6A-6C, it can be observed that the first decomposition after the solvent removal started at around 300° C. for the azo-linked polymer P1 and at around 250° C. for azo-linked polymer P2—indicating relatively high thermal stability of the materials.

Figure 7A:
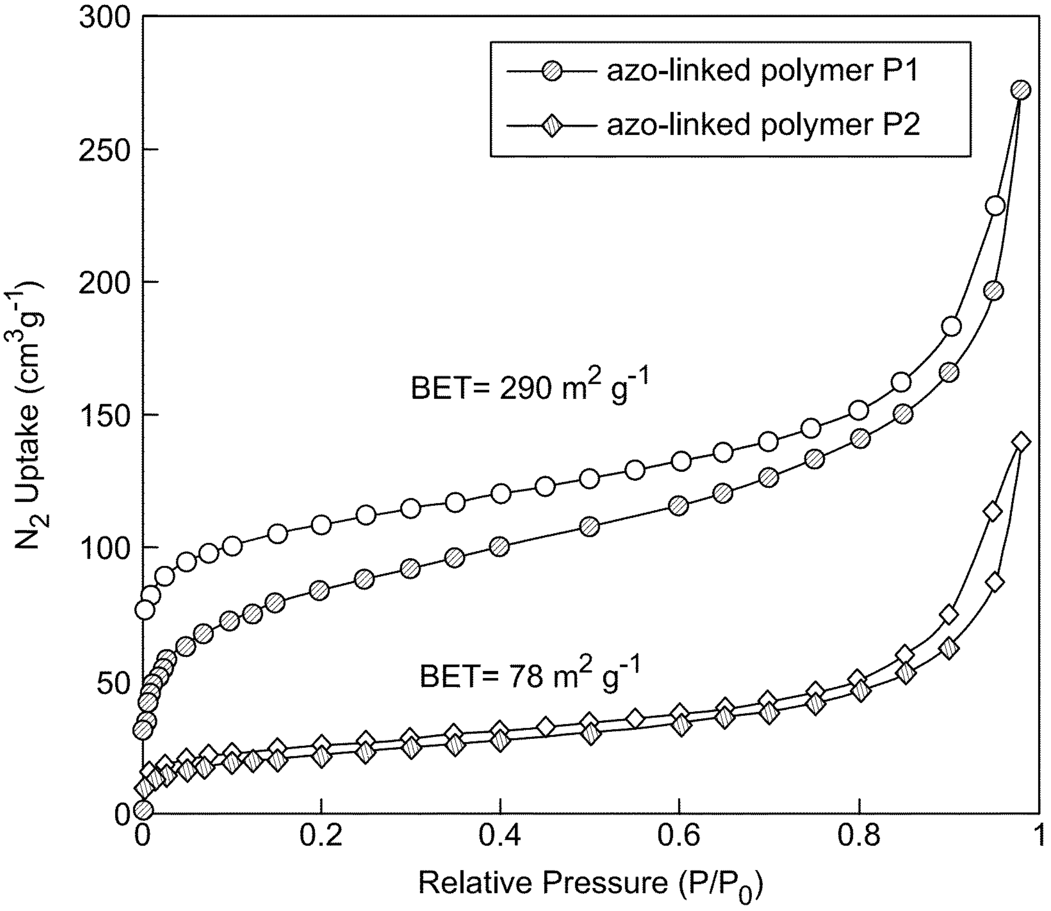
FIG. 7A is plot depicting $N_2$ sorption isotherms at 77 K for the azo-linked polymer P1 and the azo-linked polymer P1, according to certain embodiments.
Figure 7B:
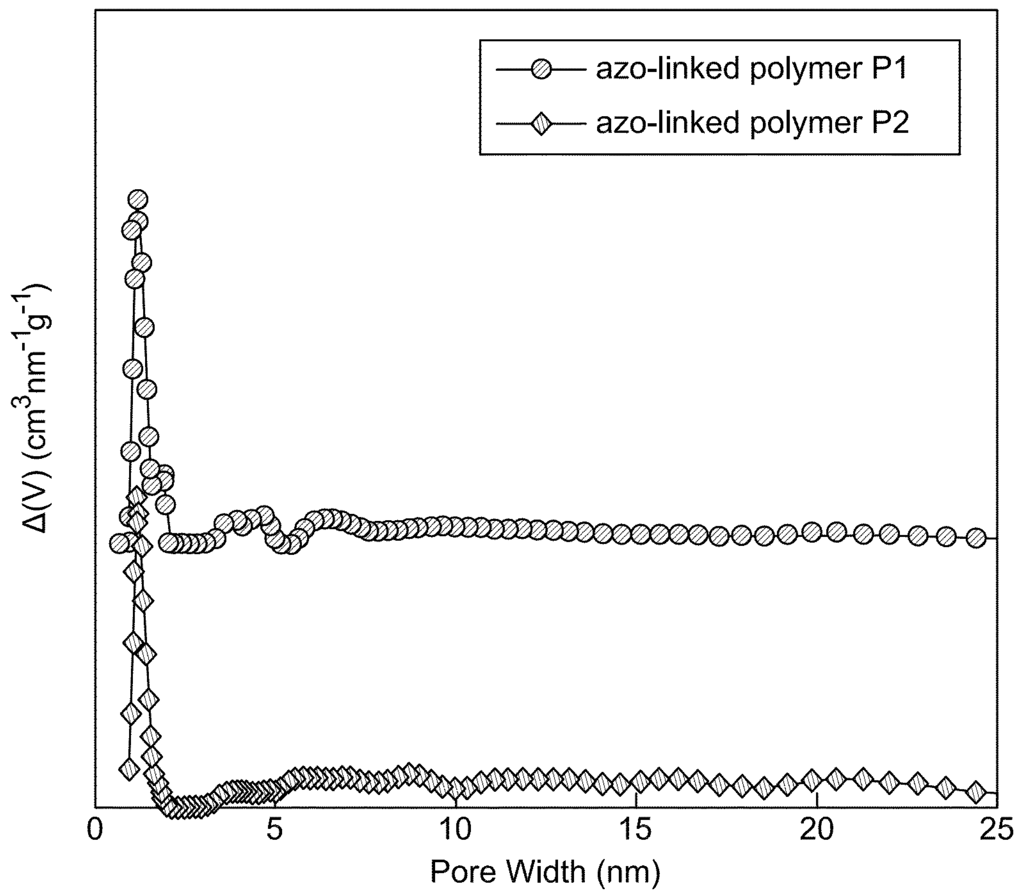
FIG. 7B is a plot depicting a pore size distribution (PSD) of the azo-linked polymer P1 and the azo-linked polymer P2, according to certain embodiments.

The permanent porosity of the materials was investigated by measuring the adsorption-desorption nitrogen isotherms at 77 K (FIG. 7A). The $N_2$ isotherms reveal high uptake at the low-pressure region ($P/P^0<0.001$) for both azo-linked polymer P1 and the azo-linked polymer P2, indicating the presence of micropores within the frameworks. The higher uptake at the higher pressure ($P/P^0<0.5$) is due to the capillary condensation of the $N_2$ in the meso- and macropore behavior. The pore size distribution (PSD) was estimated using quenched solid density functional theory (QSDFT) model, which quantitively represents the surface geometrical inhomogeneity in roughness parameters, including micro-/mesopore structures. The PSD proves that azo-linked polymer P1 is mainly a micropore material, while the azo-linked polymer P2 has both micropore and mesopore textures (FIG. 7B) that may be attributed to the flexibility of the 4,4'-methylenedianiline monomers of the azo-linked polymer P2 framework. The calculated Brunauer-Emmitt-Teller (BET) surface area of the azo-linked polymer P1 and the azo-linked polymer P2 was 290 and 78 $m^2 g^{-1}$, respectively. The BET surface areas, pore volumes, and diameters are summarized in Table 1.

TABLE 1

Surface areas and pore parameters of the azo-linked polymer P1 and the azo-linked polymer P2 materials

| Sample | BET surface area ($m^2g^{-1}$) | Langmuir surface area ($m^2 g^{-1}$) | PSD[a] (nm) | pore volume ($cm^3 g^{-1}$)[c] |
|---|---|---|---|---|
| azo-linked polymer P1 | 290 | 450 | 0.3 | 0.33 |
| azo-linked polymer P2 | 78 | 123 | 59.6 | 0.15 |

Example 11: $CO_2$ Gas Uptake Measurements

Figure 8A:
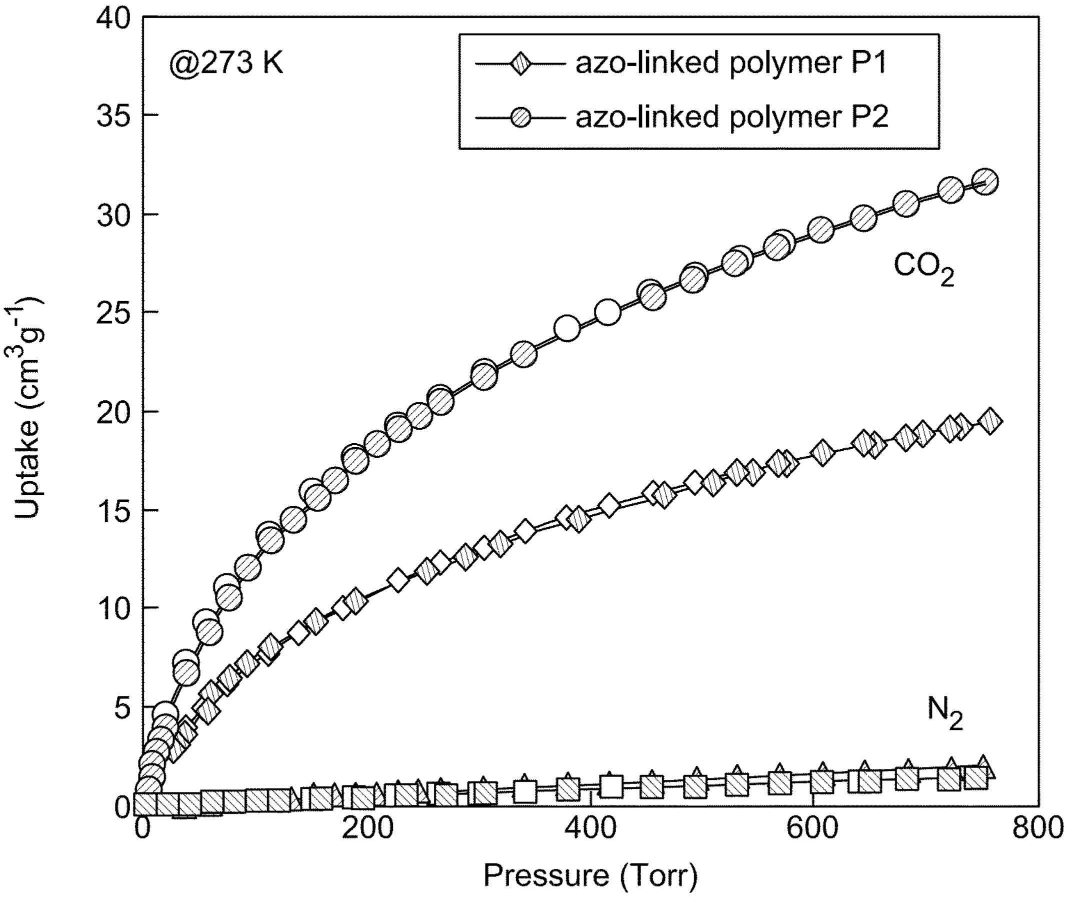
FIG. 8A is a plot depicting gas sorption analysis of the azo-linked polymer P1 and the azo-linked polymer P2 at 273 K, according to certain embodiments.
Figure 8B:
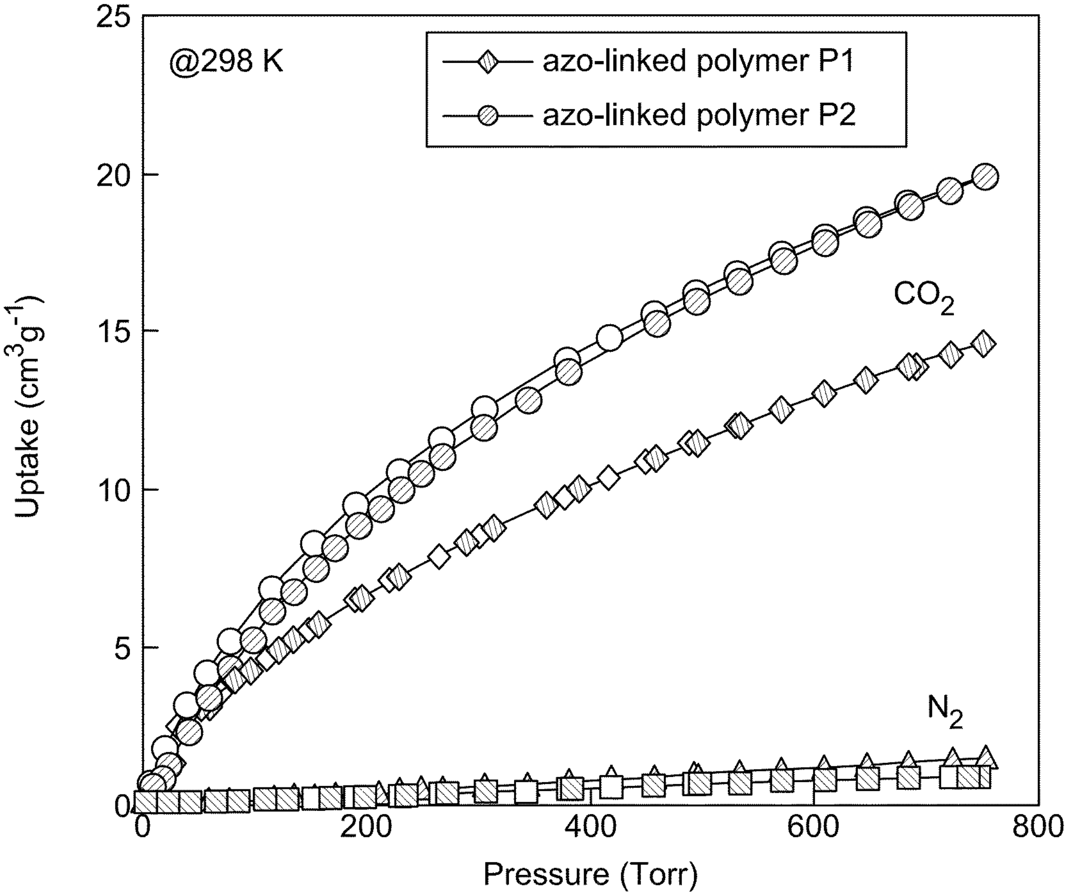
FIG. 8B is a plot depicting gas sorption analysis of the azo-linked polymer P1 and the azo-linked polymer P2 at 298 K, according to certain embodiments.

The thermodynamic adsorption measurements for $CO_2$ and $N_2$ were assessed at two different temperatures (273 and 298 K) to evaluate the capacity of the azo-linked polymer P1 and the azo-linked polymer P2 toward $CO_2$ capture. Unexpectedly as shown in FIG. 8A, the azo-linked polymer P1 has a high uptake capacity in comparison to the azo-linked polymer P2, although they have similar functionalities.

However, this is due to the difference in the surface area. The steep high $CO_2$ uptake and low pressure for both materials, compared to the poor uptake for $N_2$, indicate the strong affinity of the synthesized azo polymers toward the $CO_2$ thanks to the $CO_2$-philic functional groups (—N═N— and OH) in the frameworks. The $CO_2$ uptake capacities were 32 and 20 $cm^3$ $g^{-1}$ at 273 K and 1 bar for azo-linked polymer P1 and azo-linked polymer P2, respectively, compared with only 1.4 and 1.4 $cm^3$ $g^{-1}$ at 273 K and 1 bar for the $N_2$ uptake.

A high affinity of the azo-linked polymer P1 toward $CO_2$ is observed compared to the low $CO_2$ uptake for azo-linked polymer P2. Similar uptake capacities for $N_2$ indicate the synergistic role of the high surface area, microporosity, and polar functionality. The $CO_2$ uptake capacity of the azo-linked polymer P1 is comparable with or better than those of previously reported porous organic polymers at 273 K and 1 bar.

To understand the interactions of the $CO_2$ and the azo-linked polymers, the coverage-dependent enthalpy of adsorption ($Q_{st}$) was calculated. The $Q_{st}$ values were estimated by fitting the $CO_2$ and $N_2$ isotherms at 273 and 298 K using a viral type of expansion equation:

$$Ln(p) = \ln(v) + \frac{1}{T}\sum_{i=0}^{m}(a_i v_i) + \sum_{i=0}^{n}(b_i v_i),$$

where, P is the adsorbate pressure (torr), v is the gas uptake ($cm^3$ $g^{-1}$), T temperature (K), $a_i$ and $b_i$ are the virial coefficients, and n and m are the numbers of required coefficients required to describe the isotherm.

Figure 8C:
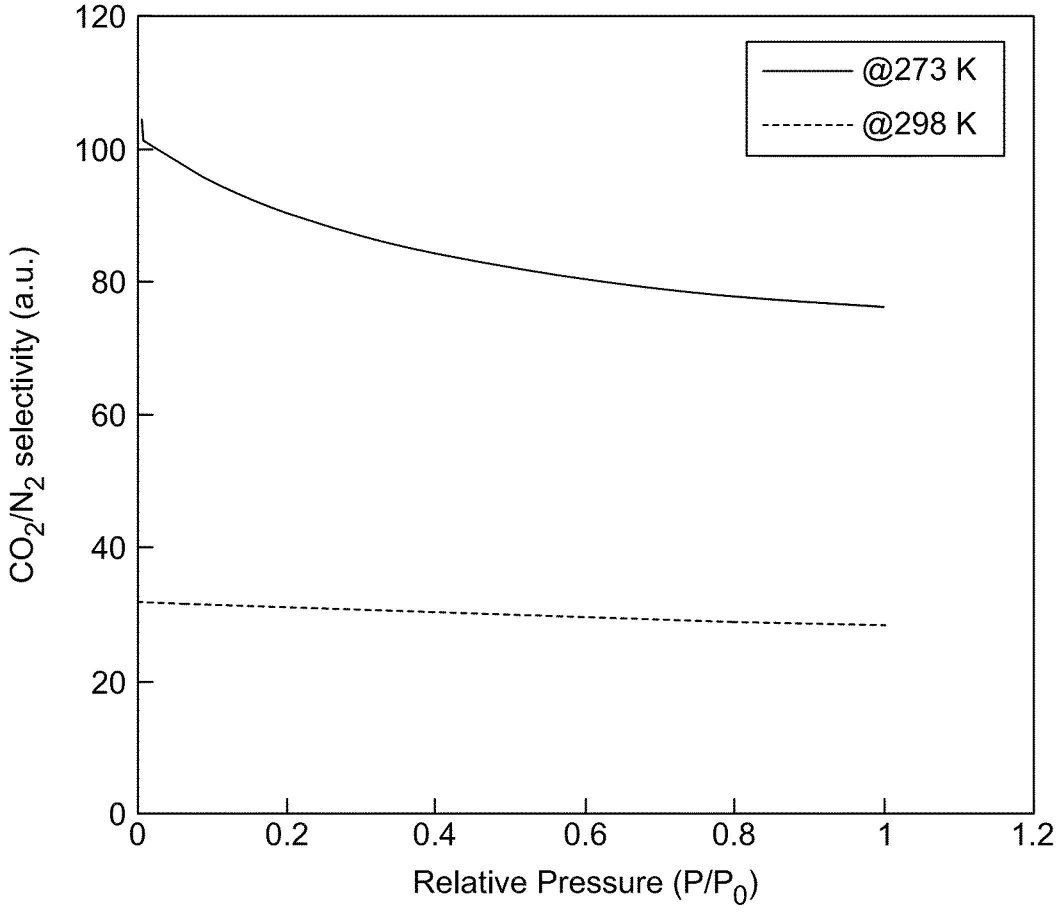
FIG. 8C is a plot depicting selective uptake of $CO_2/N_2$ by ideal adsorption solution theory (IAST) with the azo-linked polymer P1 and the azo-linked polymer P2 at 273 K, according to certain embodiments.
Figure 8D:
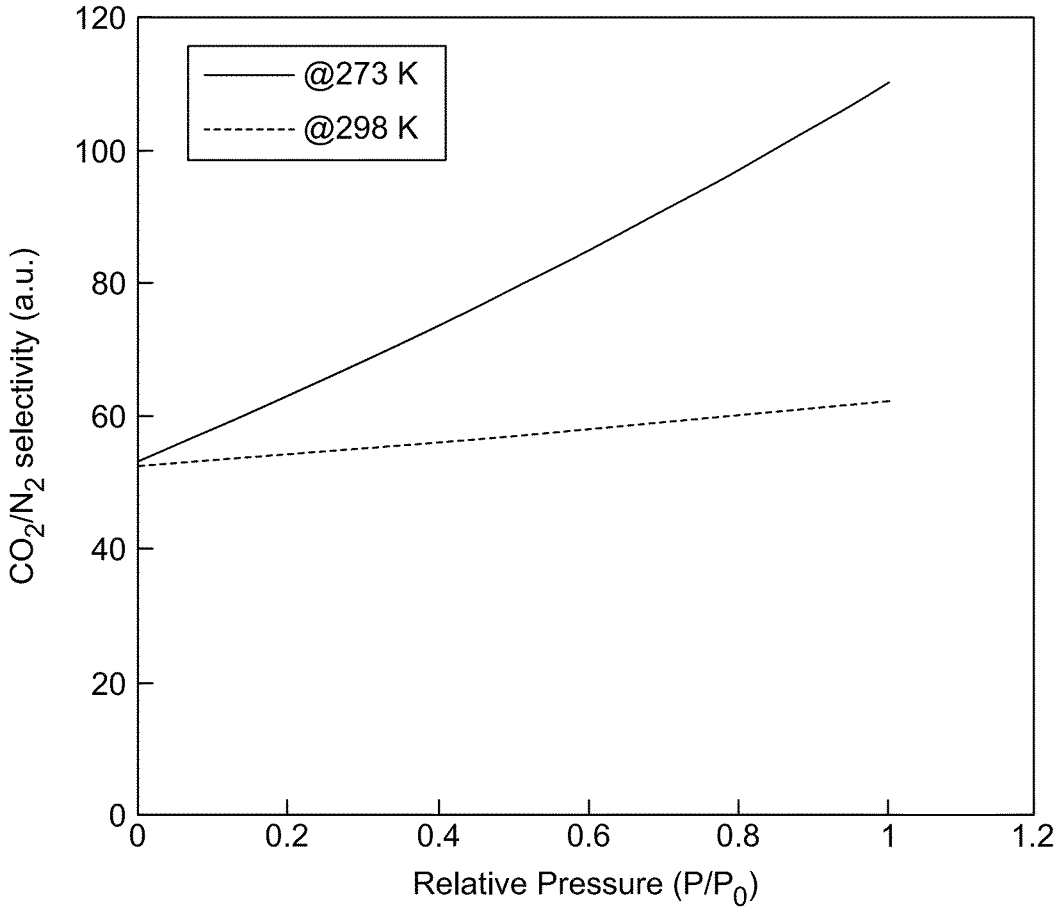
FIG. 8D is a plot depicting a selective uptake of $CO_2/N_2$ by IAST with the azo-linked polymer P1 and the azo-linked polymer P2 at 298 K, according to certain embodiments.

The initial $Q_{st}$ values (at zero coverage) for the azo-linked polymer P1 and the azo-linked polymer P2 for $CO_2$ were 40 and 23 kJ mol-1, respectively, in comparison to only 4.4 and 22.0 kJ $mol^{-1}$ for $N_2$, indicating the strong binding of $CO_2$ with the polymer frameworks. These $Q_{st}$ values are high enough for favorable physical adsorption of $CO_2$ but are still not very high, as for the aliphatic amine-based sorbents in which the strong binding with $CO_2$ forming a carbamate needs high energy for regeneration. The $CO_2/N_2$ selectivity was estimated using the ideal adsorption solution theory (IAST) model. As such, the azo-linked polymer P1 showed a good $CO_2/N_2$ selectivity of about 80 at 1 bar and 273 K (FIG. 8C).

Example 12: Metal Ion Removal Application

Figure 9:
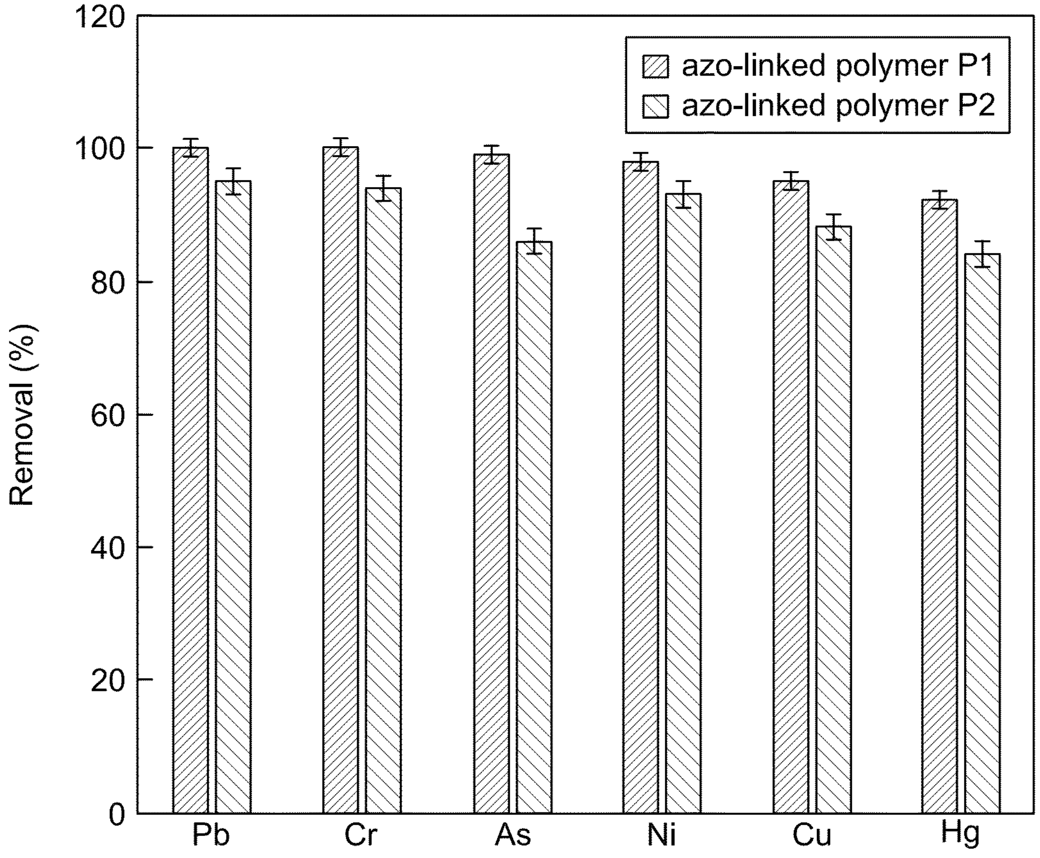
FIG. 9 is a plot depicting adsorption efficiencies of azo-linked polymer P1 and azo-linked polymer P2 for simultaneous removal of metal ions, according to certain embodiments.
Figure 10:
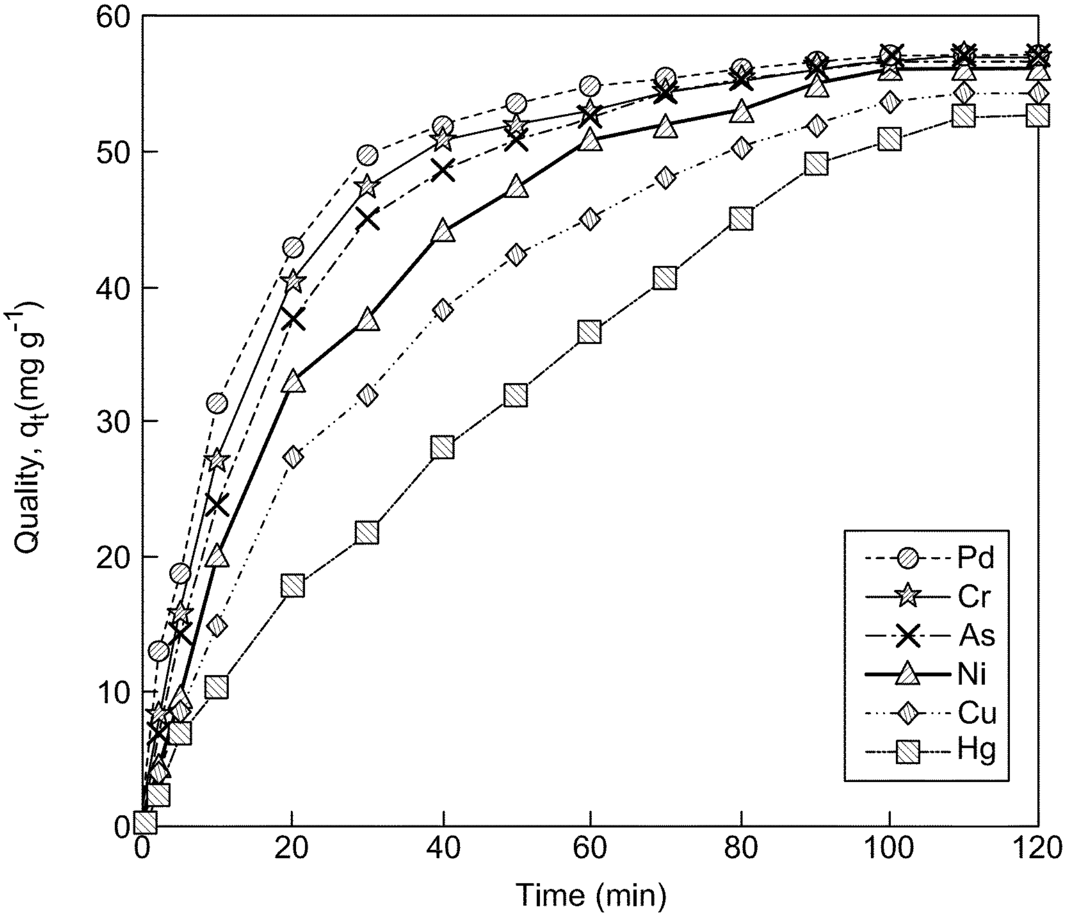
FIG. 10 is a plot depicting effect of contact time on efficiency of the azo-linked polymer P1 for removal of metal ions, according to certain embodiments.

The prepared polymers, azo-linked polymer P1, and azo-linked polymer P2, were evaluated for their efficiency in the adsorption of metal ions from aqueous media. As shown in FIG. 9, the results indicated that both polymers have high efficiency toward the adsorption of the metal ions. However, azo-linked polymer P1 showed slightly better performance than azo-linked polymer P2, which can be explained by its higher surface area and porous structure. In addition, the possible mechanisms of interactions include the formation of complexes, surface complexation, π-metal interactions, interactions with functional groups, and electrostatic interactions. As it performed better, azo-linked polymer P1 was selected for further investigation. Furthermore, the azo-linked polymer was evaluated with regard to the contact time effect on the adsorption of metal ions from aqueous media. To get insights into the capacity of polymers for metal adsorption, the capacity was presented in milligrams of the metal per gram of polymer, as shown in FIG. 10. The capacity of adsorption of metal ions increased with the increase of contact time. At contact times of around 90 and 120 min, the adsorption was almost constant, indicating an equilibrium.

Figure 11A:
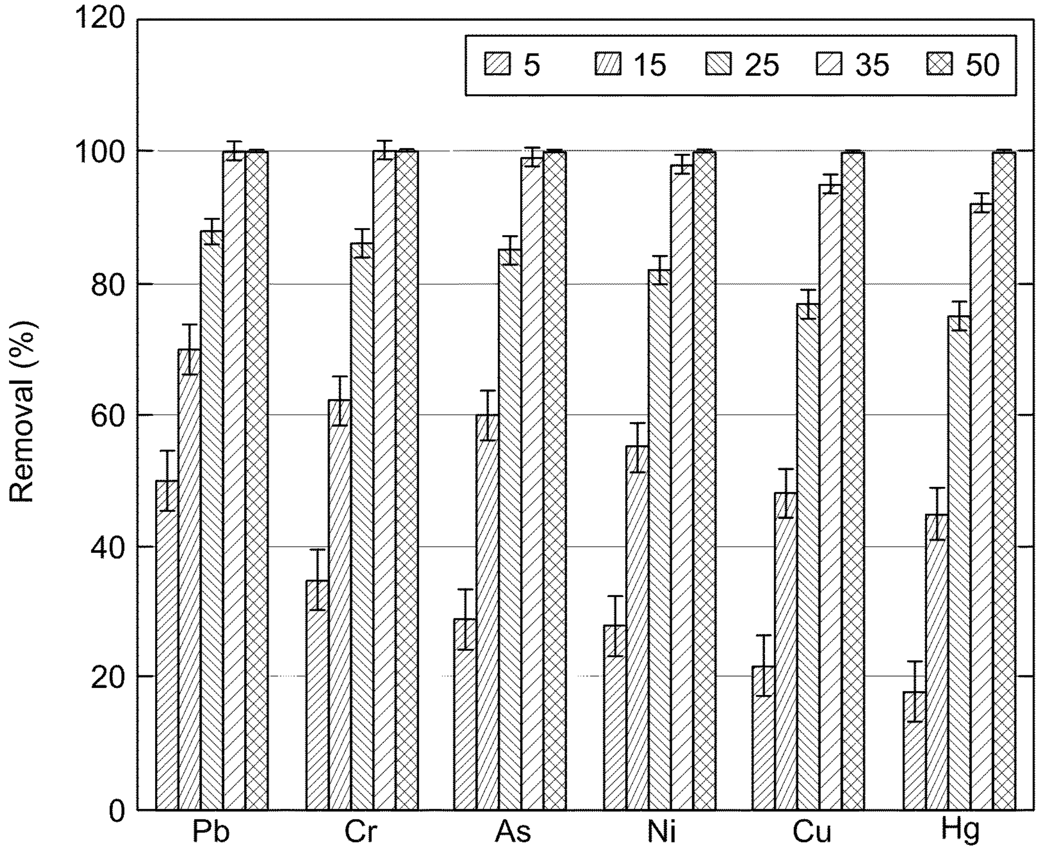
FIG. 11A is a plot depicting effect of dosage of azo-linked polymer P1 dosage on the removal of metal ions, according to certain embodiments.
Figure 11B:
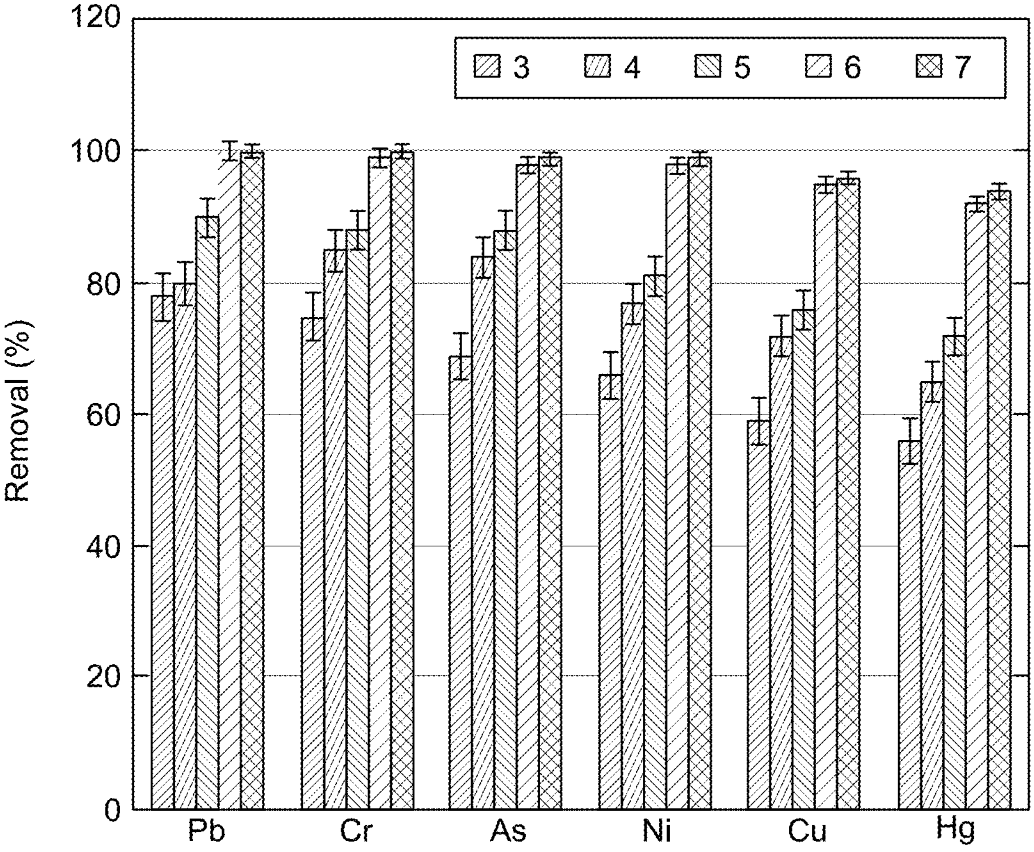
FIG. 11B is a plot depicting effect of pH on the efficiency of the azo-linked polymer P1 for the removal of metal ions, according to certain embodiments.

The effect of dosage of the azo-linked polymer P1 was investigated in FIG. 11A. By an increase in the dosage, the adsorption increased; this can be explained by the presence of more surface area and active functional groups to interact with the metal ions. The effect of the pH of the solution was also studied in the range between 3 and 7. It can be seen in FIG. 11B that, by increasing the pH, the removal of metal ions increased. At pH 3, the removal was low, which can be explained by the presence of more protons that compete with the positively charged metal ions. At higher pH, there are fewer protons, and most partially negatively charged functional groups are ready to interact with the metal ions. The presence of non-bonding electrons on oxygen and nitrogen also plays a role in interacting with negatively charged metal ions. These results highlight the high removal performance of the synthesized azo-polymers comparable with those reported in the literature.

Figure 12:
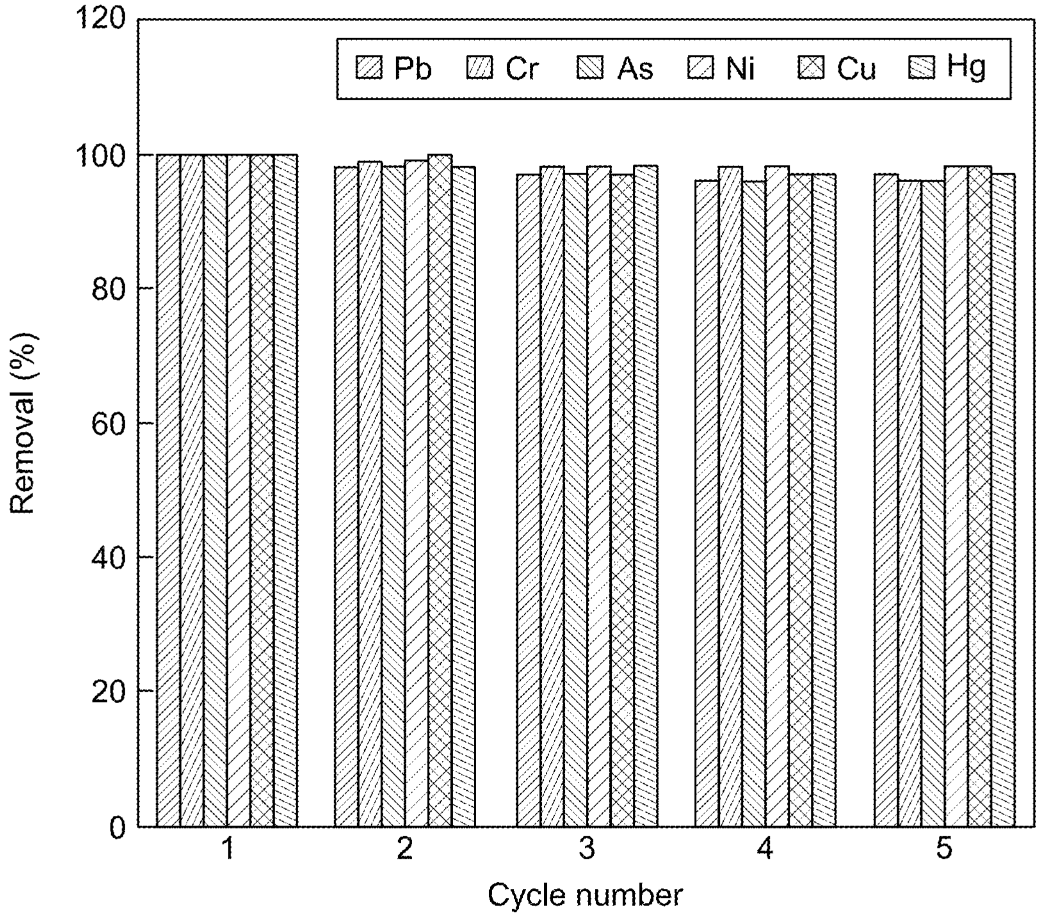
FIG. 12 is a plot depicting recycling performance of azo-linked polymer P1 in removing metals for five cycles of adsorption/desorption, according to certain embodiments.

Azo-linked polymer P1 showed promising recycling performance for removing metals even after five cycles of adsorption/desorption (FIG. 12). The excellent performance of the polymers indicates that they can be used several times due to their easy regeneration. Therefore, the polymers can be recommended for water treatment. The highest capacity was for removing lead, chromium, and arsenic, followed by nickel, copper, and mercury, which showed slightly less capacity.

Numerous modifications and variations of the present disclosure are possible in light of the above teachings. It is therefore to be understood that within the scope of the appended claims, the invention may be practiced otherwise than as specifically described herein.

The invention claimed is:

1. A polymer, comprising reacted units of:

1,3,5-trihydroxybenzene; and a compound A represented by Formula (I) below, (I)

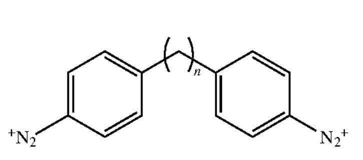

wherein in Formula (I), n=0-5, wherein compound A is bonded to the 1,3,5-trihydroxybenzene through an azo bond to form the polymer, represented by Formula (II) below, (II)

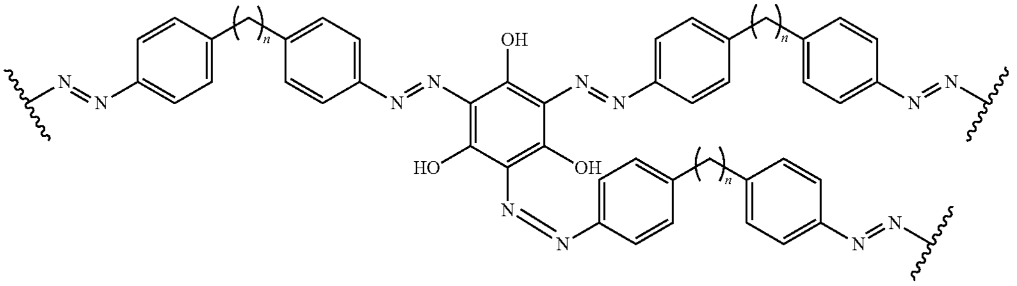

wherein in Formula (II),  represents a repeating unit of the polymer.

2. The polymer of claim 1, wherein, n=0, and wherein the polymer has a BET surface area of 270-320 $m^2/g$.

3. The polymer of claim 2, having a pore volume of 0.28-0.35 $cm^3/g$.

4. The polymer of claim 2, having only micropores with a diameter of less than 2 nm.

5. The polymer of claim 1, wherein, n=1, and wherein the polymer has a BET surface area of 70-90 $m^2/g$.

6. The polymer of claim 5, having a pore volume of 0.05-0.20 $cm^3/g$.

7. The polymer of claim 5, having both micropores with a diameter of less than 2 nm, and mesopores with a diameter of 10-100 nm.

8. The polymer of claim 1, having a thermal stability up to 250° C.

9. The polymer of claim 2, having a $CO_2$ uptake of 25-35 $cm^3/g$ at 273 K and 1 bar.

10. The polymer of claim 5, having a $CO_2$ uptake of 15-25 $cm^3/g$ at 273 K and 1 bar.

11. A method of adsorbing carbon dioxide, comprising:

contacting the polymer of claim 1 with the carbon dioxide.

12. The method of claim 11, wherein the polymer selectively adsorbs the carbon dioxide, and does not adsorb other gases selected from the group consisting of nitrogen, oxygen, and argon.

13. A method of adsorbing a metal ion from a solution, comprising:

contacting the polymer of claim 1 with the solution, wherein the metal ion is adsorbed by the polymer.

14. The method of claim 13, wherein the contacting occurs for 1 to 120 minutes.

15. The method of claim 13, wherein the solution has a pH of 3-7.

16. The method of claim 13, wherein a metal of the metal ion is selected from the group consisting of antimony, arsenic, bismuth, cadmium, cerium, chromium, cobalt, copper, gallium, gold, iron, lead, manganese, mercury, nickel, platinum, silver, tellurium, thallium, tin, uranium, vanadium, and zinc.

17. The method of claim 13, wherein the polymer is present in an amount of 5-50 mg per mL of the solution.

18. The method of claim 13, wherein at least 85% of the metal ion is adsorbed by the polymer.

19. A method of making the polymer of claim 1, comprising:

mixing an amine in an acid to form a first solution;

adding a nitrate to the first solution to form a second solution;

adjusting the pH of the second solution to 7-8 to form the compound A;

adding the 1,3,5-trihydroxybenzene to the compound A and stirring for 6-12 hours to form a reaction mixture; and filtering and purifying the reaction mixture to obtain the polymer.

* * * * *